(12) United States Patent
Usami et al.

(10) Patent No.: US 12,516,727 B2
(45) Date of Patent: Jan. 6, 2026

(54) VEHICLE DRIVE DEVICE

(71) Applicant: AISIN CORPORATION, Aichi (JP)

(72) Inventors: Naoya Usami, Kariya (JP); Daichi Yukitoki, Kariya (JP); Tsukasa Osafune, Kariya (JP); Masato Hirano, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 18/842,147

(22) PCT Filed: Jun. 2, 2023

(86) PCT No.: PCT/JP2023/020602
§ 371 (c)(1),
(2) Date: Aug. 28, 2024

(87) PCT Pub. No.: WO2023/234408
PCT Pub. Date: Dec. 7, 2023

(65) Prior Publication Data
US 2025/0180107 A1    Jun. 5, 2025

(30) Foreign Application Priority Data
Jun. 2, 2022   (JP) ................. 2022-090114

(51) Int. Cl.
*F16H 57/04* (2010.01)
*H02K 5/20* (2006.01)
(Continued)

(52) U.S. Cl.
CPC ..... *F16H 57/0476* (2013.01); *F16H 57/0409* (2013.01); *F16H 57/0424* (2013.01);
(Continued)

(58) Field of Classification Search
CPC ............ F16H 57/0476; F16H 57/0424; F16H 2057/02034; F16H 57/0453; F16H 57/0445; H02K 9/19; B60K 11/02
See application file for complete search history.

(56) References Cited

U.S. PATENT DOCUMENTS 10,539,224 B2 *   1/2020   Hori ................... F16H 57/0456
11,578,798 B2 *   2/2023   Nakata ............... F16H 57/0483
(Continued)

FOREIGN PATENT DOCUMENTS

JP   2017-114477 A   6/2017
JP   2022-103151 A   7/2022

OTHER PUBLICATIONS

Aug. 8, 2023 International Search Report issued in International Patent Application No. PCT/JP2023/020602.

*Primary Examiner* — Jake Cook
(74) *Attorney, Agent, or Firm* — Oliff PLC

(57) ABSTRACT

A first oil receiving portion disposed on a downward side of a rotary electric machine, an oil supply passage configured to supply oil accumulated in the first oil receiving portion from a flow port to a lubrication target part, and a discharge port configured to discharge the oil in the first oil receiving portion are provided. The discharge port is provided on an upper side relative to a reference oil level, which is set on a lower side relative to a rotor and on an upper side relative to the flow port, and the discharge port is provided to include a portion positioned on a lower side relative to a limitation-target oil level, which is formed by a tilt due to an attitude change and acceleration or deceleration of a vehicle.

10 Claims, 8 Drawing Sheets

(51) Int. Cl.
*H02K 7/00* (2006.01)
*H02K 7/116* (2006.01)
*H02K 9/19* (2006.01)

(52) U.S. Cl.
CPC ............... *H02K 5/20* (2013.01); *H02K 7/006* (2013.01); *H02K 7/116* (2013.01); *H02K 9/19* (2013.01); *F16H 57/0453* (2013.01)

(56) References Cited

U.S. PATENT DOCUMENTS

| | | | |
|---|---|---|---|
| 12,276,334 B2* | 4/2025 | Kosaka | H02K 7/116 |
| 2017/0175612 A1 | 6/2017 | Tokozakura et al. | |
| 2022/0316581 A1* | 10/2022 | Li | F16H 57/0415 |
| 2024/0167559 A1* | 5/2024 | Hirata | H02K 9/19 |

\* cited by examiner

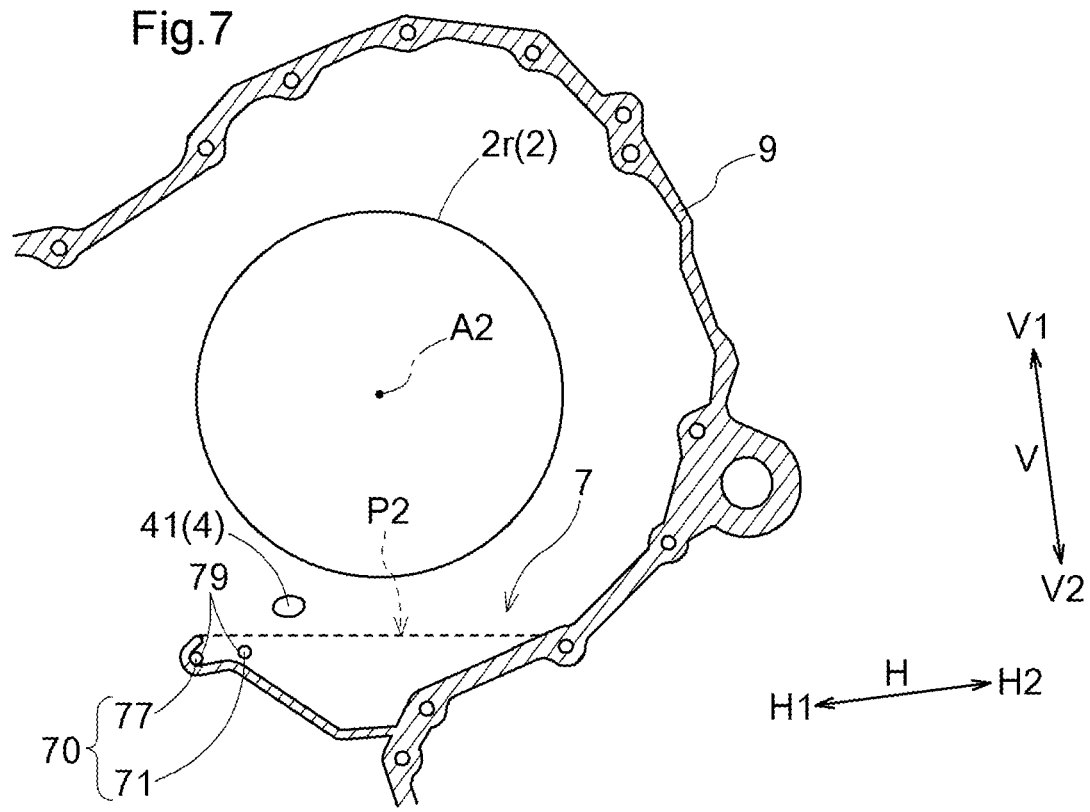
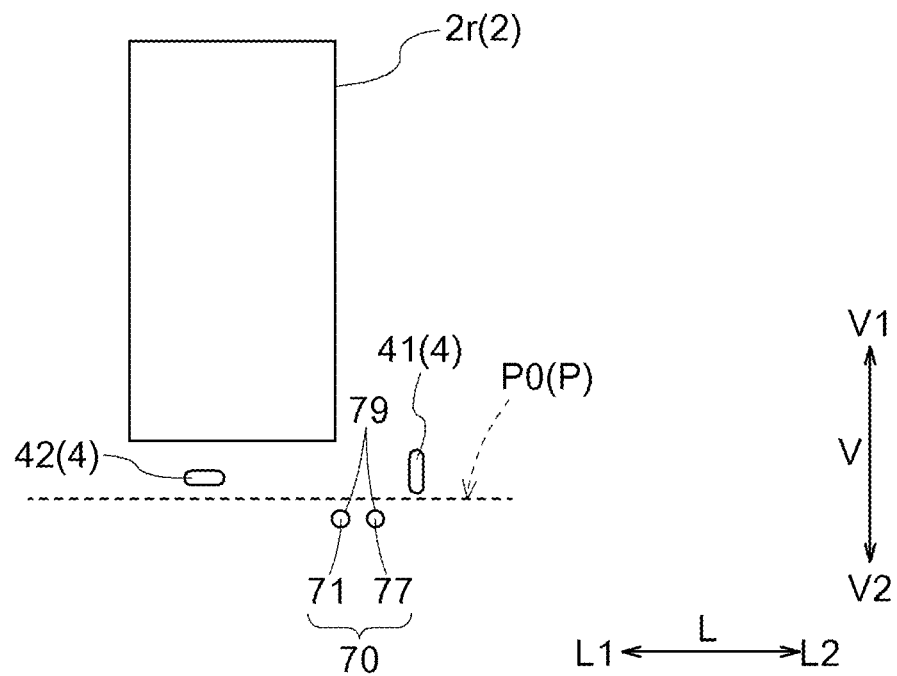

VEHICLE DRIVE DEVICE

TECHNICAL FIELD

The present disclosure relates to a vehicle drive device including an input member disposed on a first axis and drivingly coupled to an internal combustion engine, an output member drivingly coupled to a wheel, a rotary electric machine disposed on a second axis and including a rotor, and a power transmission mechanism configured to transmit power thereamong, the second axis being arranged on an upward side relative to the first axis.

BACKGROUND ART

JP 2017-114477 A (Patent Literature 1) discloses a technique for lubrication of a vehicle drive device in a hybrid vehicle including an internal combustion engine and rotary electric machines as drive power sources for wheels. In the vehicle, an oil pump (electric oil pump) driven by a drive power source different from the drive power sources for the wheels is mounted. Some of the mechanisms of the vehicle drive device are lubricated by oil supplied from this oil pump. Note that the lubrication also includes cooling. In addition, another lubrication target part can be lubricated by oil scooped up through a rotating gear, and thus the lubrication with the oil supplied from the oil pump includes the lubrication of the other lubrication target part, such as another gear, by the oil having lubricated a certain gear.

CITATION LIST

Patent Literature

Patent Literature 1: JP 2017-114477 A

SUMMARY OF DISCLOSURE

Technical Problems

Incidentally, in a hybrid vehicle like the hybrid vehicle described above, there is a case where electric power is generated by causing a rotary electric machine to be rotated by an internal combustion engine while wheels are stopped. In this case, a power transmission mechanism is controlled such that a gear that drives the wheels does not rotate. For this reason, oil is not supplied to a lubrication target part to which the oil for lubrication is supplied by being scooped up, and there is a possibility that the lubrication is insufficient. Thus, it is also conceivable to accumulate oil flowing down after cooling the rotary electric machine and guide the oil to the lubrication target part. In order to effectively receive the oil, it is preferable to provide an oil receiving portion that accumulates the oil, on a downward side of the rotary electric machine. However, when an oil level of the oil receiving portion is tilted due to an attitude change, acceleration, or the like of the vehicle, there is a possibility that a rotor of the rotary electric machine and the oil stored in the oil receiving portion interfere with each other. Due to this interference, when the oil is agitated, various influences may occur, such as a reduction in efficiency of the rotary electric machine due to an occurrence of rotation resistance of the rotor, a reduction in an amount of heat exchange due to foaming of the oil, or a reduction in a discharge pressure or a flow rate of an oil pump due to an occurrence of air bubbles in the oil.

In view of the above background, a vehicle drive device is desired in which interference with a rotor can be reduced when an oil level of stored oil is tilted due to an attitude change, acceleration, or the like of a vehicle, and in which oil having cooled a rotary electric machine can be stored and the oil can be appropriately supplied to a lubrication target part different from the rotary electric machine.

Solutions to Problems

A vehicle drive device in view of the above is a vehicle drive device including: an input member drivingly coupled to an internal combustion engine and disposed on a first axis; an output member drivingly coupled to a wheel; a rotary electric machine disposed on a second axis and including a rotor, the second axis being an axis different from the first axis and being parallel to the first axis; and a power transmission mechanism configured to transmit power among the input member, the output member, and the rotary electric machine, the vehicle drive device further including: an oil receiving portion disposed on a downward side of the rotary electric machine to receive oil for cooling supplied to the rotary electric machine and falling from the rotary electric machine; an oil supply passage configured to supply oil accumulated in the oil receiving portion, from a flow port to a lubrication target part, the flow port being formed to face the oil receiving portion; and a discharge port formed to face the oil receiving portion, the discharge port being configured to discharge oil in the oil receiving portion, in which the discharge port is provided on an upper side relative to a reference oil level and is provided to include a portion positioned on a lower side relative to a limitation-target oil level, the reference oil level being set on a lower side relative to the rotor and on an upper side relative to the flow port, in the oil receiving portion, the limitation-target oil level being an oil level brought into a state of contacting with the rotor by being tilted due to an attitude change and acceleration or deceleration of a vehicle.

According to the present configuration, the lubrication target part can be lubricated by using the oil having been supplied for cooling the rotary electric machine. Therefore, for lubricating the lubrication target part, it is not necessary to provide another oil supply source such as an oil pump. According to the present configuration, for example, even when the oil level of the oil receiving portion is tilted due to an attitude change or acceleration or deceleration of the vehicle accompanying the vehicle ascending or descending a slope, or turning, or the like, the oil level is easily maintained on a lower side relative to the lower end of the rotor. Therefore, it is easy to avoid an increase in rotation resistance of the rotor and a reduction in an amount of heat exchange due to foaming of the oil, caused when the oil in the oil receiving portion is agitated by the rotor. As described above, according to the present configuration, a vehicle drive device can be implemented in which interference with a rotor can be reduced when an oil level of stored oil is tilted due to an attitude change, acceleration, or the like of a vehicle, and in which oil having cooled a rotary electric machine can be stored and the oil can be appropriately supplied to a lubrication target part different from the rotary electric machine.

Further features and advantages of the vehicle drive device will become apparent from the description of exemplary and non-limiting embodiments given below with reference to the drawings.

BRIEF DESCRIPTION OF DRAWINGS

FIG. 7 is a view as viewed in the axial direction, schematically showing a relationship between an oil level and each of the rotor, the discharge port, and the flow ports when the vehicle is tilted to the other side in the front-rear direction.

FIG. 8 is a view as viewed in a direction orthogonal to the axial direction, schematically showing a relationship between the oil level (reference oil level) and each of the rotor, the discharge ports, and the flow ports when the vehicle is positioned on the horizontal plane.

DESCRIPTION OF EMBODIMENTS

Figure 1:
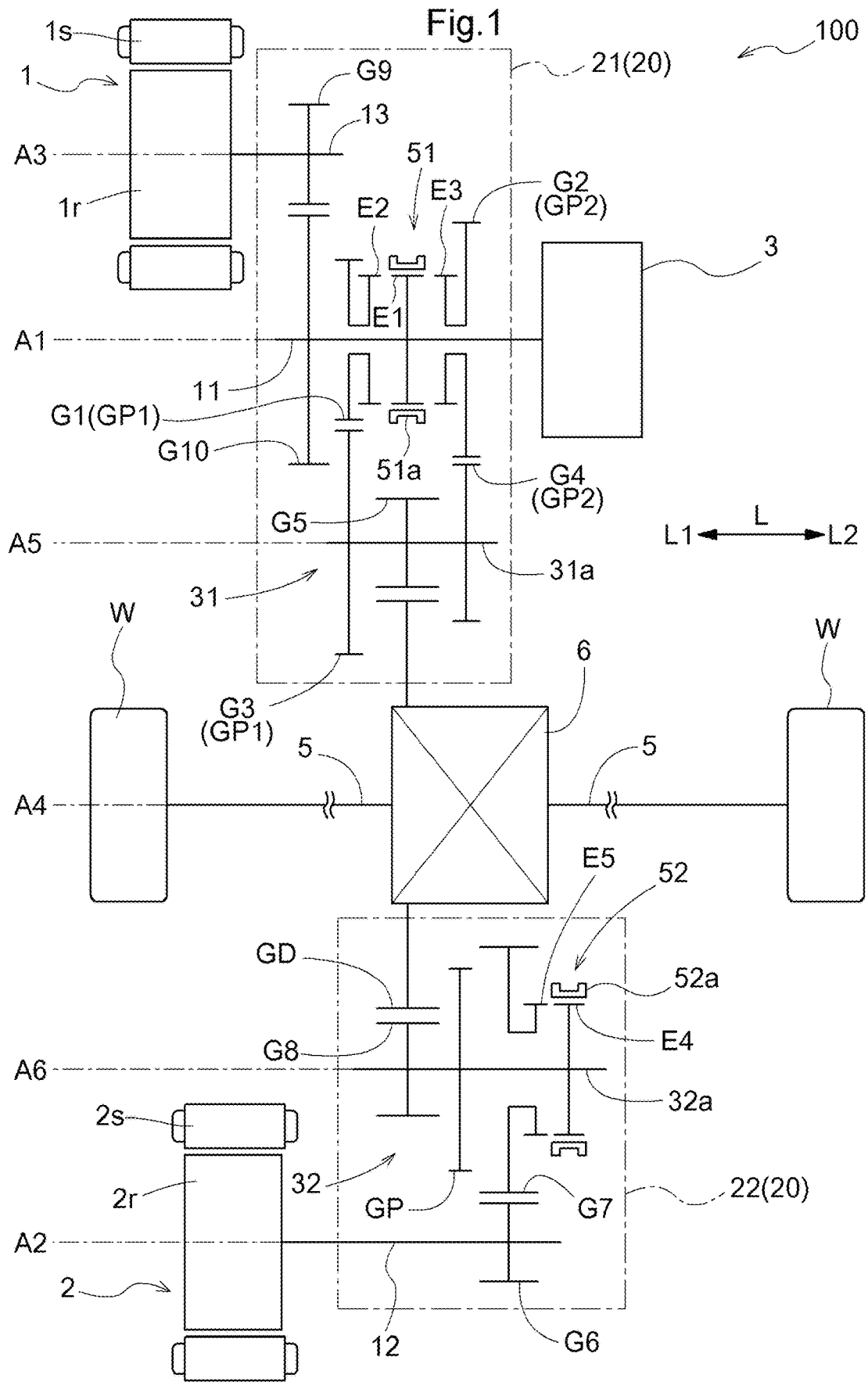
FIG. 1 is a skeleton diagram of a vehicle drive device.

Hereinafter, embodiments of a vehicle drive device will be described with reference to the drawings. Note that the directions (upward-downward direction V, axial direction L, and width direction H) for each member in the following description are based on the directions in a state where each member is assembled to the vehicle drive device in a state (reference attitude) where a vehicle is positioned on a horizontal plane. In addition, terms related to a dimension, a disposition or arrangement direction, a disposition or arrangement position, and the like for each member are concepts including a state including a difference due to deviation (deviation within a range allowable in manufacturing). In the present embodiment, a case will also be described in which the attitude of the vehicle changes from a horizontal state due to the vehicle ascending or descending a slope, or turning, or the like, but the direction in such a case may be different from the direction in the reference attitude. For example, when the vehicle is in the horizontal state, the upward-downward direction V coincides with a direction orthogonal to the horizontal plane (a vertical direction), but when the vehicle is in a state of being tilted from the horizontal state, the upward-downward direction V does not coincide with the vertical direction. Therefore, description may be appropriately made using an expression with the vertical direction in addition to the upward-downward direction V.

Further, as used herein, the phrase "drivingly coupled" refers to a state in which two rotary elements are coupled to be able to transmit drive power (synonymous with torque), and includes a state in which the two rotary elements are coupled to rotate together or a state in which the two rotary elements are coupled to be able to transmit drive power via one, or two or more transmission members. Such transmission members include various members (for example, a shaft, a gear mechanism, a belt, a chain, or the like) that transmit rotation at the same speed or at a shifted speed, and may include an engagement device (for example, a friction engagement device, a meshing-type engagement device, or the like) that selectively transmits rotation and drive power.

In addition, herein, the term "rotary electric machine" is used as a concept including a motor (electric motor), a generator (electric power generator), and a motor-generator that functions as both the motor and the generator as necessary. Further, as used herein, with respect to the disposition or arrangement of two members, the phrase "overlap as viewed in a specific direction" means that when an imaginary straight line parallel to the direction of the view is moved in each direction orthogonal to the imaginary straight line, a region where the imaginary straight line intersects both of the two members exists at least in part. In addition, as used herein, with respect to the disposition or arrangement of two members, the phrase "disposition or arrangement regions in the axial direction overlap" means that at least a part of a disposition or arrangement region in the axial direction of one of the two members is included in a disposition or arrangement region in the axial direction of the other one of the two members.

As shown in FIG. 1, a vehicle drive device 100 includes a first rotary electric machine 1, a second rotary electric machine 2, a first input member 11 drivingly coupled to an internal combustion engine 3, output members 5 drivingly coupled to wheels W, a second input member 12 drivingly coupled to the second rotary electric machine 2, and a third input member 13 drivingly coupled to the first rotary electric machine 1. The first rotary electric machine 1 includes a first stator 1s fixed to a fixing member such as a case 9, and a first rotor Ir disposed radially inward of the first stator 1s. The second rotary electric machine 2 includes a second stator 2s fixed to a fixing member such as the case 9, and a second rotor 2r disposed radially inward of the second stator 2s. The internal combustion engine 3 is a prime mover (for example, a gasoline engine, a diesel engine, or the like) that is driven by fuel combustion inside the engine to take out power. The first rotary electric machine 1 and the second rotary electric machine 2 are electrically connected to an electric storage device (not shown) such as a battery or a capacitor, and receive electric power supply from the electric storage device to perform power running, or supply electric power generated through inertial force of the vehicle, drive power of the internal combustion engine 3, or the like to the electric storage device to cause the electric storage device to store the electric power. The first rotary electric machine 1 and the second rotary electric machine 2 are electrically connected to the common electric storage device, which allows the second rotary electric machine 2 to perform power running using electric power generated by the first rotary electric machine 1.

In the present embodiment, the third input member 13 is coupled to the rotor (first rotor 1r) included in the first rotary electric machine 1 to rotate together with the first rotor 1r, and the second input member 12 is coupled to the rotor (second rotor 2r) included in the second rotary electric machine 2 to rotate together with the second rotor 2r. In addition, in the present embodiment, the first input member 11 is coupled to the internal combustion engine 3 (specifically, an output member such as a crankshaft or the like included in the internal combustion engine 3; similar applies hereinafter) via a torque limiter TL (see FIG. 2). The torque limiter TL limits the magnitude of torque transmitted between the first input member 11 and the internal combustion engine 3 to disconnect transmission of excessive torque. In the case of using a damper device with the torque limiter TL (damper device including a damper mechanism and the torque limiter TL), the first input member 11 is coupled to the internal combustion engine 3 via the torque limiter TL and the damper mechanism.

Figure 2:
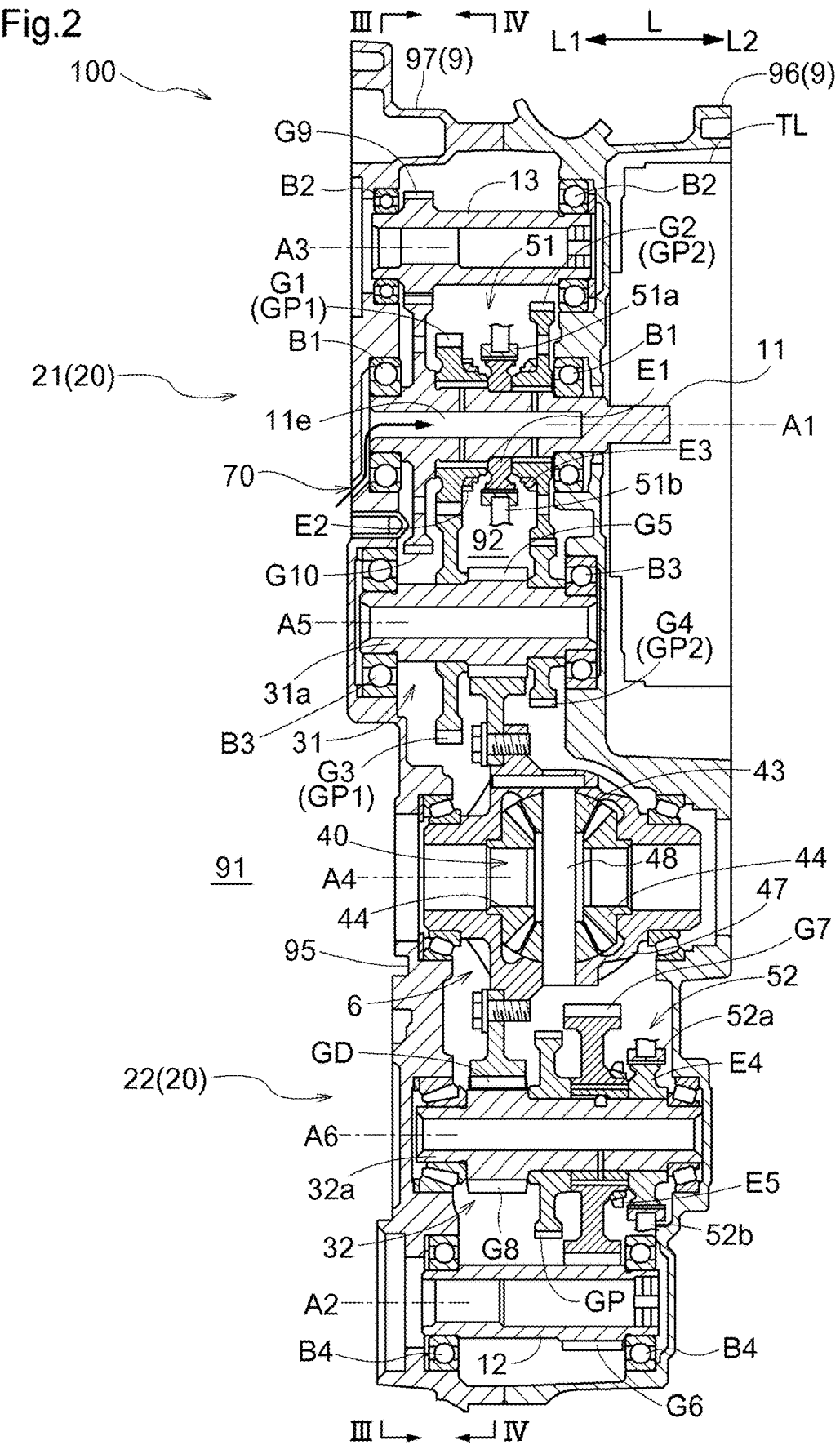
FIG. 2 is a partial cross-sectional view of the vehicle drive device.

As shown in FIG. 2, the vehicle drive device 100 includes the case 9, and each of the first input member 11, the second input member 12, and the third input member 13 is housed in the case 9. Here, the term "house" means to house at least a portion of a target object to be housed. Each of the first input member 11, the second input member 12, and the third input member 13 is supported by the case 9 to be rotatable with respect to the case 9. The case 9 also houses a differential gear device 6, a first counter gear mechanism 31, and a second counter gear mechanism 32 to be described later.

As shown in FIG. 2, the case 9 includes a first chamber 91 housing the first rotary electric machine 1 and the second rotary electric machine 2, and a second chamber 92 housing a power transmission mechanism 20. The first chamber 91 and the second chamber 92 are separated by a partition wall 95. Note that the case 9 includes a main body case 97 formed with the partition wall 95, a rotary-electric-machine-side cover case (not shown) abutting on the main body case 97 from a first axial side L1 to form the first chamber 91 together with the main body case 97, and a transmission-mechanism-side cover case 96 abutting on the main body case 97 from a second axial side L2 to form the second chamber 92 together with the main body case 97.

The vehicle drive device 100 includes the differential gear device 6. As shown in FIG. 1, the differential gear device 6 includes a differential input gear GD, and distributes the rotation of the differential input gear GD to the pair of output members 5 drivingly coupled to the respective wheels W. Assuming that one of the wheels W to which one of the output members 5 is drivingly coupled is a first wheel and the other one of the wheels W to which the other one of the output members 5 is drivingly coupled is a second wheel, the first wheel and the second wheel are a pair of left and right wheels W (for example, a pair of left and right front wheels, or a pair of left and right rear wheels). In the present embodiment, each of the output members 5 is a drive shaft, and each of the output members 5 is coupled to the corresponding one of the wheels W to rotate at the same speed as the speed of the corresponding coupling target wheel W. Each of the output members 5 is coupled to the coupling target wheel W, via, for example, a constant-velocity joint (not shown). When the wheels W are driven by torque transmitted via the output members 5, the vehicle (the vehicle in which the vehicle drive device 100 is mounted; similar applies hereinafter) travels.

As shown in FIG. 2, in the present embodiment, the differential gear device 6 includes a bevel-gear-type differential gear mechanism 40, and a differential case 47 housing the differential gear mechanism 40. The differential case 47 is supported by the case 9 to be rotatable with respect to the case 9. The differential input gear GD is coupled to the differential case 47 to rotate together with the differential case 47. Specifically, the differential input gear GD is attached to the differential case 47 to protrude outward in a radial direction (a radial direction with reference to a fourth axis A4 to be described later) from the differential case 47.

The differential gear mechanism 40 includes pinion gears 43, and a pair of side gears 44 that mesh with the pinion gears 43. The pinion gears 43 (for example, two pinion gears 43) are supported by a pinion shaft 48 to be rotatable with respect to the pinion shaft 48 held by the differential case 47. The differential gear mechanism 40 distributes the rotation of the differential input gear GD to the pair of side gears 44. Each of the side gears 44 is coupled (here, spline-coupled) to the coupling target output member 5 to rotate together with the output member 5.

As shown in FIGS. 1 and 2, the first input member 11 is disposed on a first axis A1, the second input member 12 is disposed on a second axis A2, the third input member 13 is disposed on a third axis A3, the differential gear device 6 is disposed on the fourth axis A4, the first counter gear mechanism 31 to be described later is disposed on a fifth axis A5, and the second counter gear mechanism 32 to be described later is disposed on a sixth axis A6. The first axis A1, the second axis A2, the third axis A3, the fourth axis A4, the fifth axis A5, and the sixth axis A6 are axes (imaginary axes) different from one another, and are arranged in parallel to one another. A direction parallel to these axes (A1 to A6) (that is, an axial direction common between the axes) is defined as the axial direction L. In addition, one side in the axial direction L is defined as the first axial side L1, and the other side in the axial direction L (the side opposite to the first axial side L1 in the axial direction L) is defined as the second axial side L2.

As shown in FIG. 1, the first input member 11 is disposed on the first axial side L1 with respect to the internal combustion engine 3. In addition, the third input member 13 is disposed on the second axial side L2 with respect to the first rotary electric machine 1, and the second input member 12 is disposed on the second axial side L2 with respect to the second rotary electric machine 2.

As shown in FIG. 1, the vehicle drive device 100 includes a first gear mechanism 21 that causes the first input member 11 and the third input member 13 to be drivingly coupled to each other and that causes the first input member 11 and the differential input gear GD to be drivingly coupled to each other. The first gear mechanism 21 causes the third input member 13 and the differential input gear GD to be drivingly coupled to each other via the first input member 11. That is, the first gear mechanism 21 allows drive power to be transmitted between the first input member 11 drivingly coupled to the internal combustion engine 3 and the first rotary electric machine 1. By using the first gear mechanism 21, connection can be made between a first power transmission path, which is a power transmission path between the third input member 13 and the first input member 11, and a third power transmission path, which is a power transmission path between the first input member 11 and the differential input gear GD. The third power transmission path is selectively connected (that is, connected or disconnected) through a first switching mechanism 51 to be described later. On the other hand, in the present embodiment, the first power transmission path is always connected.

In addition, the vehicle drive device 100 includes a second gear mechanism 22 that causes the second input member 12 and the differential input gear GD to be drivingly coupled to each other. The second gear mechanism 22 causes the second input member 12 and the differential input gear GD to be drivingly coupled to each other without via the first gear mechanism 21. By using the second gear mechanism 22, connection can be made in a second power transmission path, which is a power transmission path between the second input member 12 and the differential input gear GD. That is, the second gear mechanism 22 allows drive power to be transmitted between the second rotary electric machine 2 and the output members 5. In the present embodiment, the second power transmission path is selectively connected through a second switching mechanism 52 to be described later.

In a state where the third power transmission path is disconnected and the second power transmission path is connected, an electric traveling mode and a series mode can be implemented in the vehicle drive device 100. The electric traveling mode is a traveling mode in which drive power of the second rotary electric machine 2 drives the output members 5 to cause the vehicle to travel. The series mode is a traveling mode in which drive power of the internal combustion engine 3 causes the first rotary electric machine 1 to generate electric power and the drive power of the second rotary electric machine 2 drives the output members 5 to cause the vehicle to travel. In the electric traveling mode and the series mode, the third power transmission path is disconnected, and the first rotary electric machine 1 and the internal combustion engine 3 are cut off from the output members 5.

In addition, in a state where the second power transmission path and the third power transmission path are connected, a parallel mode can be implemented in the vehicle drive device 100. The parallel mode is a traveling mode in which at least the drive power of the internal combustion engine 3 drives the output members 5 to cause the vehicle to travel. In the parallel mode, the drive power of the second rotary electric machine 2 is transmitted to the output members 5 as necessary to supplement the drive power of the internal combustion engine 3. In a case where the second rotary electric machine 2 is stopped in the parallel mode (for example, when the vehicle is traveling at a high speed), the second rotary electric machine 2 drivingly coupled to the differential input gear GD without via the first input member 11 can be cut off from the differential input gear GD by disconnecting the second power transmission path. Therefore, in a case where the second rotary electric machine 2 is stopped in the parallel mode, corotation of the second rotary electric machine 2 can be avoided, and as a result, an occurrence of energy loss due to dragging of the second rotary electric machine 2 can be reduced. Note that in the parallel mode, in addition to the drive power of the second rotary electric machine 2 or instead of the drive power of the second rotary electric machine 2, the drive power of the first rotary electric machine 1 may be transmitted to the output members 5 to supplement the drive power of the internal combustion engine 3.

The first gear mechanism 21 and the second gear mechanism 22 correspond to the power transmission mechanism 20 that changes a power transmission state among the third input member 13, the output members 5, the first rotary electric machine 1, and the second rotary electric machine 2, and that transmits power thereamong. In addition, as described above, the series mode is an operation mode in which the state enters into a state where the drive power is transmitted between the first input member 11 and the first rotary electric machine 1 and the drive power is transmitted between the second rotary electric machine 2 and the output members 5. Further, the parallel mode is an operation mode in which the state enters into a state where the drive power is transmitted among the first input member 11, the second rotary electric machine 2, and the output members 5. The power transmission mechanism 20 can implement at least two operation modes of the series mode and the parallel mode.

As shown in FIG. 1, the first gear mechanism 21 includes a third input gear G9 that is disposed coaxially with the third input member 13, and a first input gear G10 that is disposed coaxially with the first input member 11 and that meshes with the third input gear G9. In the present embodiment, the third input gear G9 is coupled to the third input member 13 to rotate together with the third input member 13, and the first input gear G10 is coupled to the first input member 11 to rotate together with the first input member 11. That is, in the present embodiment, the third input member 13 and the first input member 11 are always coupled via the gear pair of the third input gear G9 and the first input gear G10, and thus the first power transmission path between the third input member 13 and the first input member 11 is always connected.

As shown in FIGS. 1 and 2, in the present embodiment, the third input gear G9 is formed to have a diameter smaller than the diameter of the first input gear G10. That is, a gear ratio between the third input gear G9 and the first input gear G10 is set such that the rotation of the third input member 13 is transmitted to the first input member 11 at a reduced rotation speed (in other words, the rotation of the first input member 11 is transmitted to the third input member 13 at an increased rotation speed).

The first gear mechanism 21 further includes a first gear G1 and a second gear G2 disposed coaxially with the first input member 11, and the first counter gear mechanism 31. The first gear G1 is disposed on the first axial side L1 with respect to the second gear G2. The first counter gear mechanism 31 includes a first counter shaft 31a, a third gear G3 that meshes with the first gear G1, a fourth gear G4 that meshes with the second gear G2, and a fifth gear G5 that rotates together with the first counter shaft 31a and that meshes with the differential input gear GD. The third gear G3 is disposed on the first axial side L1 with respect to the fourth gear G4. Moreover, in the present embodiment, the fifth gear G5 is disposed between the third gear G3 and the fourth gear G4 in the axial direction L.

As shown in FIGS. 1 and 2, in the present embodiment, the fifth gear G5 is formed to have a diameter smaller than the diameter of the differential input gear GD. That is, the gear ratio between the fifth gear G5 and the differential input gear GD is set such that the rotation of the first counter shaft 31a is transmitted to the differential gear device 6 (specifically, the differential input gear GD) at a reduced rotation speed.

The first gear mechanism 21 is provided with the first switching mechanism 51 that switches among a state in which drive power is transmitted between the first input member 11 and the first counter shaft 31a via a first gear pair GP1 of the first gear G1 and the third gear G3, a state in which drive power is transmitted between the first input member 11 and the first counter shaft 31a via a second gear pair GP2 of the second gear G2 and the fourth gear G4, and a state in which drive power is not transmitted between the first input member 11 and the first counter shaft 31a.

Hereinafter, the state in which drive power is transmitted between the first input member 11 and the first counter shaft 31*a* via the first gear pair GP1 (that is, the state in which the first input member 11 and the first counter shaft 31*a* are coupled via the first gear pair GP1) is referred to as a "first coupled state". In addition, the state in which drive power is transmitted between the first input member 11 and the first counter shaft 31*a* via the second gear pair GP2 (that is, the state in which the first input member 11 and the first counter shaft 31*a* are coupled via the second gear pair GP2) is referred to as a "second coupled state". Further, the state in which drive power is not transmitted between the first input member 11 and the first counter shaft 31*a* is referred to as a "decoupled state". The fifth gear G5 that meshes with the differential input gear GD is coupled to the first counter shaft 31*a* to rotate together with the first counter shaft 31*a*. Therefore, in the first coupled state and the second coupled state, a state is obtained in which drive power is transmitted between the first input member 11 and the differential input gear GD (that is, the third power transmission path is connected), and in the decoupled state, a state is obtained in which drive power is not transmitted between the first input member 11 and the differential input gear GD (that is, the third power transmission path is disconnected).

In the present embodiment, each of the third gear G3 and the fourth gear G4 is coupled to the first counter shaft 31*a* to rotate together with the first counter shaft 31*a*. Moreover, the first switching mechanism 51 is configured to switch among a state in which only the first gear G1 out of the first gear G1 and the second gear G2 is coupled to the first input member 11, a state in which only the second gear G2 out of the first gear G1 and the second gear G2 is coupled to the first input member 11, and a state in which both the first gear G1 and the second gear G2 are cut off from the first input member 11. That is, the first gear G1 and the second gear G2 are selectively coupled to the first input member 11 through the first switching mechanism 51.

In the state where only the first gear G1 out of the first gear G1 and the second gear G2 is coupled to the first input member 11, the first coupled state is obtained. In addition, in the state where only the second gear G2 out of the first gear G1 and the second gear G2 is coupled to the first input member 11, the second coupled state is obtained. Further, in the state where both the first gear G1 and the second gear G2 are cut off from the first input member 11, the decoupled state is obtained. Note that in the first coupled state, the second gear G2 is supported by the first input member 11 to be rotatable relative to the first input member 11. Note that in the second coupled state, the first gear G1 is supported by the first input member 11 to be rotatable relative to the first input member 11. Note that in the decoupled state, the first gear G1 and the second gear G2 are supported by the first input member 11 to be rotatable relative to the first input member 11.

The rotation speed ratio between the first input member 11 and the first counter shaft 31*a* is determined in accordance with the gear ratio between the first gear G1 and the third gear G3 in the first coupled state, and is determined in accordance with the gear ratio between the second gear G2 and the fourth gear G4 in the second coupled state. Moreover, the gear ratio between the first gear G1 and the third gear G3 is set to be different from the gear ratio between the second gear G2 and the fourth gear G4. Therefore, by switching between the first coupled state and the second coupled state using the first switching mechanism 51, the rotation speed ratio between the first input member 11 and the first counter shaft 31*a* can be switched to different values.

In the present embodiment, assuming that a ratio of the rotation speed of the first input member 11 to the rotation speed of the differential input gear GD is a speed ratio, the gear ratio between the first gear G1 and the third gear G3 and the gear ratio between the second gear G2 and the fourth gear G4 are set such that a speed ratio in the first coupled state is larger than a speed ratio in the second coupled state. Therefore, a low speed is formed in the first coupled state, and a high speed is formed in the second coupled state. The gear ratio between the first gear G1 and the third gear G3 and the gear ratio between the second gear G2 and the fourth gear G4 are set in this manner. Thus, in the present embodiment, the first gear G1 is formed to have a diameter smaller than the diameter of the second gear G2, and the third gear G3 is formed to have a diameter larger than the diameter of the fourth gear G4.

In the present embodiment, the first gear G1 is formed to have a diameter smaller than the diameter of the third gear G3. That is, the gear ratio between the first gear G1 and the third gear G3 is set such that the rotation of the first input member 11 is transmitted to the first counter shaft 31*a* at a reduced rotation speed. In addition, in the present embodiment, the second gear G2 is formed to have a diameter larger than the diameter of the fourth gear G4. That is, the gear ratio between the second gear G2 and the fourth gear G4 is set such that the rotation of the first input member 11 is transmitted to the first counter shaft 31*a* at an increased rotation speed.

In the present embodiment, the first switching mechanism 51 is configured using a meshing-type engagement device (dog clutch). Specifically, the first switching mechanism 51 includes a first sleeve member 51*a* that is movable in the axial direction L, a first engagement portion E1 that rotates together with the first input member 11, a second engagement portion E2 that rotates together with the first gear G1, and a third engagement portion E3 that rotates together with the second gear G2. The first sleeve member 51*a*, the first engagement portion E1, the second engagement portion E2, and the third engagement portion E3 are disposed on the first axis A1. That is, the first switching mechanism 51 (specifically, at least the first sleeve member 51*a*, the first engagement portion E1, the second engagement portion E2, and the third engagement portion E3) is disposed coaxially with the first input member 11.

The position of the first sleeve member 51*a* in the axial direction L is switched by a first shift fork 51*b* (see FIG. 2), which is supported by the case 9 to be movable in the axial direction L. The first shift fork 51*b* is engaged with the first sleeve member 51*a* (specifically, a groove portion formed on the outer peripheral surface of the first sleeve member 51*a*) to move together with the first sleeve member 51*a* in the axial direction L in a state of allowing the rotation (rotation about the first axis A1) of the first sleeve member 51*a*. The first shift fork 51*b* is caused to move in the axial direction L by drive power of an actuator such as an electric actuator or a hydraulic actuator.

In the present embodiment, internal teeth are formed on the inner peripheral surface of the first sleeve member 51*a*, and external teeth are formed on each of the respective outer peripheral surfaces of the first engagement portion E1, the second engagement portion E2, and the third engagement portion E3. The first sleeve member 51*a* is coupled to the first engagement portion E1 such that the first sleeve member 51*a* is non-rotatable relative to the first engagement portion E1 while being movable in the axial direction L relative to the first engagement portion E1, in a state of being disposed to be externally fitted to the first engagement portion E1. The first engagement portion E1 (specifically, the external teeth formed on the first engagement portion E1) engages with the first sleeve member 51a (specifically, the internal teeth formed on the first sleeve member 51a) regardless of the position of the first sleeve member 51a in the axial direction L. On the other hand, the second engagement portion E2 (specifically, the external teeth formed on the second engagement portion E2) and the third engagement portion E3 (specifically, the external teeth formed on the third engagement portion E3) selectively engage with the first sleeve member 51a (specifically, the internal teeth formed on the first sleeve member 51a) in accordance with the position of the first sleeve member 51a in the axial direction L.

The first switching mechanism 51 is configured to switch among the first coupled state, the second coupled state, and the decoupled state in accordance with the position of the first sleeve member 51a in the axial direction L. Specifically, the decoupled state is obtained in a state where the first sleeve member 51a has moved to a position in the axial direction L at which the first sleeve member 51a engages with the first engagement portion E1 and does not engage with the second engagement portion E2 and the third engagement portion E3 (see FIGS. 1 and 2). In addition, the first coupled state is obtained in a state where the first sleeve member 51a has moved to a position in the axial direction L at which the first sleeve member 51a engages with the first engagement portion E1 and the second engagement portion E2 and does not engage with the third engagement portion E3 (a position on the first axial side L1 with respect to the position of the first sleeve member 51a shown in each of FIGS. 1 and 2). Further, the second coupled state is obtained in a state where the first sleeve member 51a has moved to a position in the axial direction L at which the first sleeve member 51a engages with the first engagement portion E1 and the third engagement portion E3 and does not engage with the second engagement portion E2 (a position on the second axial side L2 with respect to the position of the first sleeve member 51a shown in each of FIGS. 1 and 2).

As shown in FIG. 2, in the present embodiment, the first input member 11 is supported by the case 9 at two locations in the axial direction L via a pair of first bearings B1. As described above, the second chamber 92 is formed by the main body case 97 and the transmission-mechanism-side cover case 96 abutting on the main body case 97 from the second axial side L2. One of the pair of first bearings B1 is supported by the partition wall 95 formed in the main body case 97, and the other one of the pair of first bearings B1 is supported by the transmission-mechanism-side cover case 96. The first input gear G10, the first gear G1, and the second gear G2 housed in the second chamber 92 are disposed between the pair of first bearings B1 in the axial direction L.

Similarly, the third input member 13 is supported by the case 9 at two locations in the axial direction L via a pair of second bearings B2. One of the pair of second bearings B2 is supported by the partition wall 95 formed in the main body case 97, and the other one of the pair of second bearings B2 is supported by the transmission-mechanism-side cover case 96. The third input gear G9 housed in the second chamber 92 is disposed between the pair of first bearings B1 in the axial direction L.

In addition, in the present embodiment, the first counter shaft 31a is supported by the case 9 at two locations in the axial direction L via a pair of third bearings B3. Similarly to the first bearings B1 and the second bearings B2, one of the pair of third bearings B3 is supported by the partition wall 95 formed in the main body case 97, and the other one of the pair of third bearings B3 is supported by the transmission-mechanism-side cover case 96. The third gear G3, the fourth gear G4, and the fifth gear G5 are disposed between the pair of third bearings B3.

As shown in FIG. 1, the second gear mechanism 22 includes a sixth gear G6 (second input gear) disposed coaxially with the second input member 12, and the second counter gear mechanism 32. The second counter gear mechanism 32 includes a second counter shaft 32a, a seventh gear G7 that meshes with the sixth gear G6, and an eighth gear G8 that rotates together with the second counter shaft 32a and that meshes with the differential input gear GD. In the present embodiment, the sixth gear G6 is formed to have a diameter smaller than the diameter of the seventh gear G7. That is, the gear ratio between the sixth gear G6 and the seventh gear G7 is set such that the rotation of the second input member 12 is transmitted to the second counter shaft 32a at a reduced rotation speed. In addition, in the present embodiment, the eighth gear G8 is formed to have a diameter smaller than the diameter of the differential input gear GD. That is, the gear ratio between the eighth gear G8 and the differential input gear GD is set such that the rotation of the second counter shaft 32a is transmitted to the differential gear device 6 (specifically, the differential input gear GD) at a reduced rotation speed. In the present embodiment, the seventh gear G7 is formed to have a diameter larger than the diameter of the eighth gear G8.

The second gear mechanism 22 is provided with the second switching mechanism 52 that switches between a transmission state in which drive power is transmitted between the second input member 12 and the second counter shaft 32a via a gear pair of the sixth gear G6 and the seventh gear G7, and a non-transmission state in which drive power is not transmitted between the second input member 12 and the second counter shaft 32a. The eighth gear G8 that meshes with the differential input gear GD is coupled to the second counter shaft 32a to rotate together with the second counter shaft 32a. Therefore, in the transmission state, a state is obtained in which drive power is transmitted between the second input member 12 and the differential input gear GD (that is, the second power transmission path is connected), and in the non-transmission state, a state is obtained in which drive power is not transmitted between the second input member 12 and the differential input gear GD (that is, the second power transmission path is disconnected).

In the present embodiment, the sixth gear G6 is coupled to the second input member 12 to rotate together with the second input member 12. Moreover, the second switching mechanism 52 is configured to switch between a state in which the seventh gear G7 is coupled to the second counter shaft 32a and a state in which the seventh gear G7 is cut off from the second counter shaft 32a. That is, the seventh gear G7 is selectively coupled to the second counter shaft 32a through the second switching mechanism 52. In the state where the seventh gear G7 is coupled to the second counter shaft 32a, the transmission state is obtained. In addition, in the state where the seventh gear G7 is cut off from the second counter shaft 32a, the non-transmission state is obtained. Note that in the non-transmission state, the seventh gear G7 is supported by the second counter shaft 32a to be rotatable relative to the second counter shaft 32a.

In the present embodiment, the second switching mechanism 52 is configured using a meshing-type engagement device (dog clutch). Specifically, the second switching mechanism 52 includes a second sleeve member 52*a* that is movable in the axial direction L, a fourth engagement portion E4 that rotates together with the second counter shaft 32*a*, and a fifth engagement portion E5 that rotates together with the seventh gear G7. The second sleeve member 52*a*, the fourth engagement portion E4, and the fifth engagement portion E5 are disposed on the sixth axis A6. That is, the second switching mechanism 52 (specifically, at least the second sleeve member 52*a*, the fourth engagement portion E4, and the fifth engagement portion E5) is disposed coaxially with the second counter gear mechanism 32. As described above, the second switching mechanism 52 includes the second sleeve member 52*a* coaxially with the second counter gear mechanism 32. As will be described later, the second sleeve member 52*a* moves in the axial direction L to switch between the transmission state and the non-transmission state.

The position of the second sleeve member 52*a* in the axial direction L is switched by a second shift fork 52*b* (see FIGS. 2 and 3), which is supported by the case 9 to be movable in the axial direction L. The second shift fork 52*b* is engaged with the second sleeve member 52*a* (specifically, a groove portion formed on the outer peripheral surface of the second sleeve member 52*a*) to move together with the second sleeve member 52*a* in the axial direction L in a state of allowing the rotation (rotation about the sixth axis A6) of the second sleeve member 52*a*. Although details will be described later, a drive mechanism for driving the second sleeve member 52*a* in the axial direction L is configured using the second shift fork 52*b*.

In the present embodiment, internal teeth are formed on the inner peripheral surface of the second sleeve member 52*a*, and external teeth are formed on each of the respective outer peripheral surfaces of the fourth engagement portion E4 and the fifth engagement portion E5. The second sleeve member 52*a* is coupled to the fourth engagement portion E4 such that the second sleeve member 52*a* is non-rotatable relative to the fourth engagement portion E4 while being movable in the axial direction L relative to the fourth engagement portion E4, in a state of being disposed to be externally fitted to the fourth engagement portion E4. The fourth engagement portion E4 (specifically, the external teeth formed on the fourth engagement portion E4) engages with the second sleeve member 52*a* (specifically, the internal teeth formed on the second sleeve member 52*a*) regardless of the position of the second sleeve member 52*a* in the axial direction L. On the other hand, the fifth engagement portion E5 (specifically, the external teeth formed on the fifth engagement portion E5) selectively engages with the second sleeve member 52*a* (specifically, the internal teeth formed on the second sleeve member 52*a*) in accordance with the position of the second sleeve member 52*a* in the axial direction L.

The second switching mechanism 52 is configured to switch between the transmission state and the non-transmission state in accordance with the position of the second sleeve member 52*a* in the axial direction L. Specifically, the non-transmission state is obtained in a state where the second sleeve member 52*a* has moved to a position in the axial direction L at which the second sleeve member 52*a* engages with the fourth engagement portion E4 and does not engage with the fifth engagement portion E5 (see FIGS. 1 and 2). In addition, the transmission state is obtained in a state where the second sleeve member 52*a* has moved to a position in the axial direction L at which the second sleeve member 52*a* engages with the fourth engagement portion E4 and the fifth engagement portion E5 (a position on the first axial side L1 with respect to the position of the second sleeve member 52*a* shown in each of FIGS. 1 and 2).

As shown in FIG. 2, in the present embodiment, the second input member 12 is supported by the case 9 at two locations in the axial direction L via a pair of fourth bearings B4. Similarly to the first bearings B1 and the like, one of the pair of fourth bearings B4 is supported by the partition wall 95 formed in the main body case 97, and the other one of the pair of fourth bearings B4 is supported by the transmission-mechanism-side cover case 96. The sixth gear G6 housed in the second chamber 92 is disposed between the pair of fourth bearings B4 in the axial direction L.

Incidentally, the first rotary electric machine 1, the second rotary electric machine 2, the power transmission mechanism 20, and the differential gear device 6 included in the vehicle drive device 100 are lubricated (including being cooled) by oil. The oil for lubrication is supplied to the vehicle drive device 100 from at least one of a mechanical oil pump (not shown) or an electric oil pump (not shown). Here, the mechanical oil pump is an oil pump driven by, as drive power sources therefor, one or more of the internal combustion engine 3, the first rotary electric machine 1, and the second rotary electric machine 2, which are drive power sources for the wheel W. The electric oil pump is an oil pump driven by a drive power source different from the drive power source for the wheel W (this different drive power source is, for example, a rotary electric machine (motor) different from the first rotary electric machine 1 and the second rotary electric machine 2). In the present embodiment, an oil pump that supplies oil for cooling to the second rotary electric machine 2, that is, an oil pump that operates independently of the wheel W, is the electric oil pump.

Note that, in addition to the electric oil pump, the oil pump that operates independently of the wheel W may be, for example, a mechanical oil pump driven by at least one of the first rotary electric machine 1 or the internal combustion engine 3, which rotates when electric power generation is performed while the wheel is stopped. Oil passages to the mechanism parts are formed in the vehicle drive device 100, and oil from these oil pumps is supplied. However, if the oil passages are formed for all the mechanism parts, there are possibilities that the oil passages are complicated and the size of the vehicle drive device 100 increases. In addition, in a case where the number of oil passages increases, it may be necessary to increase the discharge performance of the oil pump.

Therefore, as well as a case in which oil is directly supplied from an oil pump by forming oil passages from the oil pump, another case is often implemented in which oil is supplied to some of the mechanisms in the vehicle drive device 100 and the other mechanisms are lubricated by using the oil having lubricated the some mechanisms. For example, there is a case where a configuration is made such that the other mechanisms are lubricated by causing the oil to be scooped up or by causing the oil to be splashed by centrifugal force, through rotary members such as various gears included in the vehicle drive device 100. Note that as such a rotary member, for example, the differential input gear GD is mainly used.

Here, when the rotary member rotates, the oil can be supplied to a lubrication target part through the rotary member, but when the rotary member does not rotate, the oil cannot be sufficiently supplied. As described above, the vehicle drive device 100 can operate in at least two operation modes of the series mode and the parallel mode in accordance with the state of the power transmission mechanism 20. In the series mode, for example, while the wheels are stopped, the internal combustion engine 3 can be driven, and the first rotary electric machine 1 can be operated for regeneration to generate electric power, thereby enabling charging the electric storage device. At this time, the first gear mechanism 21 is controlled such that the drive power from the internal combustion engine 3 is not transmitted to the wheels W. Also at this time, the second gear mechanism 22 is also controlled such that the drive power of the second rotary electric machine 2 is not transmitted to the wheels W. That is, when electric power is generated while the wheels are stopped, many rotary members included in the power transmission mechanism 20 are not rotating, and there is a possibility that the oil is not sufficiently supplied with scooping or the like.

For example, in the series mode, during the electric power generation while the wheels are stopped, at least the first input member 11, the first rotary electric machine 1, the third input gear G9, and the first input gear G10 are rotating, and preferably, these parts and the bearings supporting these parts are appropriately lubricated. The vehicle drive device 100 according to the present embodiment is configured such that these parts are appropriately lubricated even in such a case.

Figure 3:
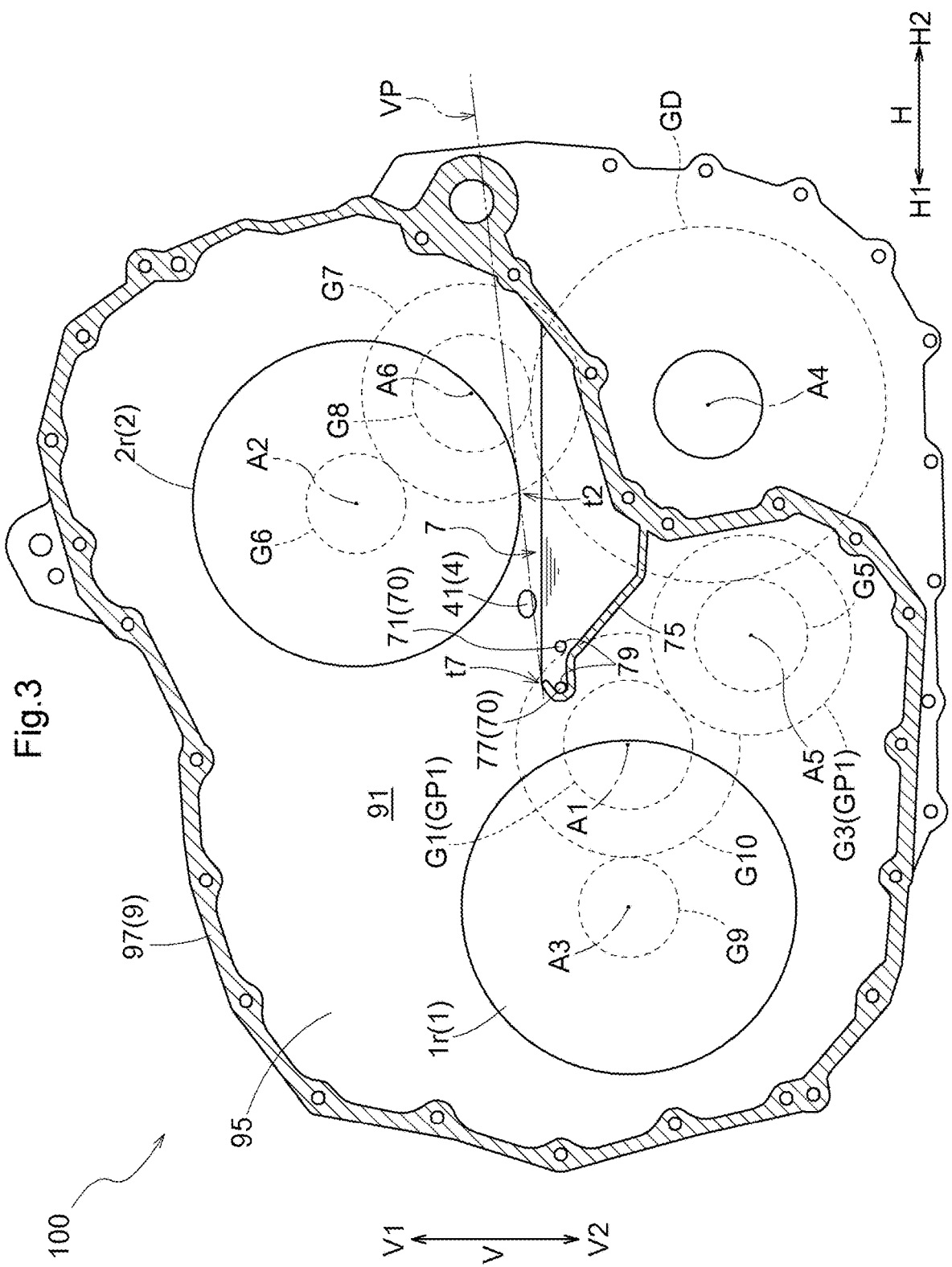
FIG. 3 is a schematic cross-sectional view in which a first chamber is viewed from a side facing a partition wall, in an axial direction.
Figure 4:
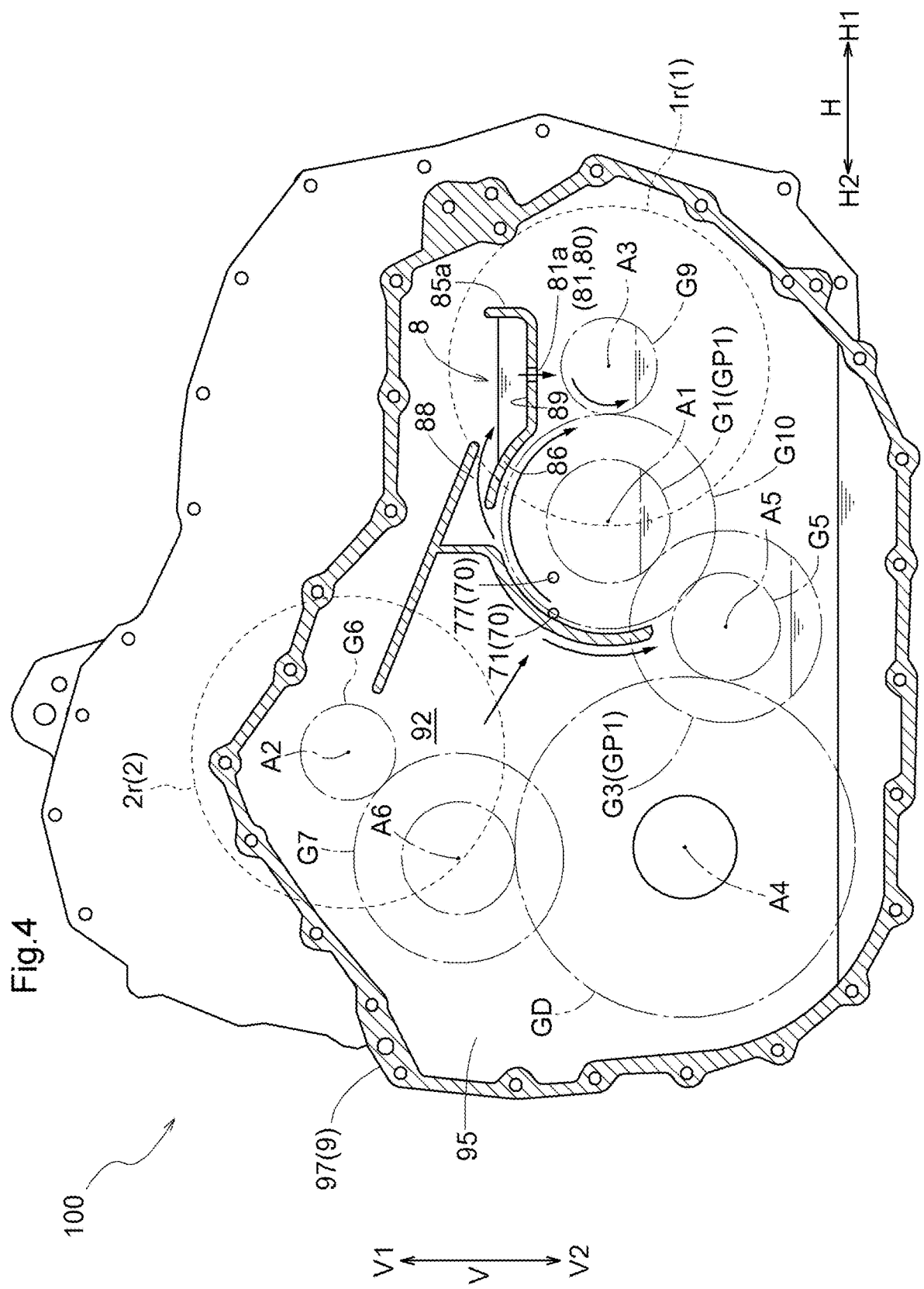
FIG. 4 is a schematic cross-sectional view in which a second chamber is viewed from a side facing the partition wall, in the axial direction.

As described above, the case 9 includes the first chamber 91 housing the first rotary electric machine 1 and the second rotary electric machine 2, the second chamber 92 housing the power transmission mechanism 20, and the partition wall 95 separating the first chamber 91 and the second chamber 92. FIG. 3 shows a schematic cross-sectional view in which the first chamber 91 is viewed from a side facing the partition wall 95, in the axial direction L, and FIG. 4 shows a schematic cross-sectional view in which the second chamber 92 is viewed from a side facing the partition wall 95, in the axial direction L. In the following description, the axial direction L is assumed to be along the horizontal direction in a state where the vehicle drive device 100 is mounted in the vehicle, and a direction orthogonal to the horizontal direction is defined as the upward-downward direction V. In addition, a direction orthogonal to the axial direction L and the upward-downward direction V is defined as the width direction H, and a side in the width direction His referred to as a first widthwise side H1 and a side opposite thereto in the width direction H is referred to as a second widthwise side H2. The width direction H is a direction along the horizontal direction.

Although details will be described later, as shown in FIG. 3, the vehicle drive device 100 includes a first oil receiving portion 7 that is disposed on a downward side V2 of the second rotary electric machine 2 and that receives oil falling from the second rotary electric machine 2. The first oil receiving portion 7 is disposed inside the first chamber 91. Specifically, the first oil receiving portion 7 is formed inside the first chamber 91 by abutment between a rib (first main-body-side rib 75) protruding from the partition wall 95 in the main body case 97 toward the rotary-electric-machine-side cover case side and a rib (first cover-side rib: not shown) protruding from a wall surface of the rotary-electric-machine-side cover case toward the main body case 97 side. The first oil receiving portion 7 is formed in a bowl shape to store oil. Note that in the present embodiment, the "rib" forming each of the first oil receiving portion 7, a second oil receiving portion 8, and the like includes a portion forming an outer wall of the case 9 in addition to a protruding wall protruding from the inner surface of the case 9. Further, as shown in FIGS. 3 and 4, the vehicle drive device 100 includes a first oil supply passage 70 that supplies the oil accumulated in the first oil receiving portion 7 to the first bearing B1 that supports the first input member 11 and the first input gear G10 that rotates together with the first input member 11. The first oil supply passage 70 is provided such that the first oil supply passage 70 penetrates through the partition wall 95 to allow communication between the first chamber 91 and the second chamber 92. Note that in the present embodiment, the first oil supply passage 70 includes a first first oil passage 71 and a second first oil passage 77.

In addition, as shown in FIG. 4, in the second chamber 92, the second oil receiving portion 8, an oil guide passage 88, and a second oil passage 81 (second oil supply passage 80) are formed. The oil guide passage 88 guides oil supplied from the first first oil passage 71 (first oil supply passage 70) to the first input gear G10 and scooped up by the first input gear G10, to the second oil receiving portion 8. The second oil passage 81 (second oil supply passage 80) supplies oil accumulated in the second oil receiving portion 8 to the second bearing B2 supporting the third input member 13 serving as the rotation shaft of the first rotary electric machine 1. The second oil receiving portion 8 is formed inside the second chamber 92 by abutment between a rib (second main-body-side rib 85a) protruding from the partition wall 95 in the main body case 97 toward the transmission-mechanism-side cover case 96 side and a rib protruding from a wall surface of the transmission-mechanism-side cover case 96 toward the main body case 97 side. The second oil receiving portion 8 is formed in a bowl shape to store oil. Note that a bottom portion 89 of the second oil receiving portion 8 is disposed on the downward side V2 relative to an upper end of the first input gear G10.

For example, oil supplied from the electric oil pump is supplied, for cooling the second rotary electric machine 2, from an upward side V1 relative to the second rotary electric machine 2 toward the second rotary electric machine 2. More specifically, the oil is supplied toward a stator coil wound around the second stator 2s of the second rotary electric machine 2. The oil having cooled the second rotary electric machine 2 flows toward the downward side V2 in accordance with gravity. As shown in FIG. 3, the oil falling from the second rotary electric machine 2 is received by the first oil receiving portion 7 disposed on the downward side V2 of the second rotor 2r, and is stored in the first oil receiving portion 7. For the first oil receiving portion 7, the first oil supply passage 70 (first first oil passage 71, second first oil passage 77) is formed, which is provided to penetrate through the partition wall 95 to allow communication between the first chamber 91 and the second chamber 92, and which supplies the oil accumulated in the first oil receiving portion 7 to the second chamber 92. In the present embodiment, in a state where the first rotary electric machine 1 is generating electric power while the wheels W are stopped, the second rotary electric machine 2 is not driven, but in view of the configuration of the oil passages, the oil for cooling is supplied to the second rotary electric machine 2 in addition to the first rotary electric machine 1.

The oil supplied to the second chamber 92 through the first first oil passage 71 lubricates the first input gear G10. The oil having passed through the second first oil passage 77 lubricates the first bearing B1 for the first input member 11. Moreover, for example, as shown in FIG. 2, the oil having passed through the first oil supply passage 70 lubricates the first bearing B1 on the left side in the drawing, and then is supplied to a shaft internal space 11e of the first input member 11. This oil performs shaft internal lubrication, and is also used for lubrication of other portions through an oil passage provided radially from the shaft internal space 11e.

The oil supplied to the second chamber 92 through the first first oil passage 71 lubricates the first input gear G10. As shown in FIG. 4, the oil supplied through the first first oil passage 71 is scooped up by the rotation of the first input gear G10. The oil is conveyed by centrifugal force to a radially outer side of a guide rib 86 formed along the outer periphery of the first input gear G10, and flows to the second oil receiving portion 8 through the radially outer side of the guide rib 86. That is, on the radially outer side of the guide rib 86, the oil guide passage 88 is formed, which guides the oil supplied from the first first oil passage 71 to the first input gear G10 and scooped up by the first input gear G10 to the second oil receiving portion 8.

As shown in FIG. 4, the second oil receiving portion 8 is connected with the second oil passage 81, which supplies the oil accumulated in the second oil receiving portion 8 to the second bearing B2 (see FIG. 2) supporting the third input member 13 serving as the rotation shaft of the first rotary electric machine 1. As described above, the second oil receiving portion 8 is formed inside the second chamber 92 by abutment between the second main-body-side rib 85a protruding from the partition wall 95 in the main body case 97 toward the transmission-mechanism-side cover case 96 side and the second cover-side rib (not shown) protruding from the wall surface of the transmission-mechanism-side cover case 96 toward the main body case 97 side. For example, the second oil passage 81 can be formed on a one-by-one basis in each of the second main-body-side rib 85a and the second cover-side rib. As shown in FIG. 4, a main-body-side second oil passage 81a can be formed in the second main-body-side rib 85a, and a cover-side second oil passage can be formed in the second cover-side rib. As shown in FIG. 4, the second oil receiving portion 8 is disposed on the upward side V1 relative to the third axis A3 on which the first rotary electric machine 1 is disposed, which allows the oil to be appropriately supplied to the second bearing B2 for the first rotary electric machine 1.

As described above, the pair of second bearings B2 are supported by the partition wall 95 and the transmission-mechanism-side cover case 96. Since the second oil passage 81 is formed on each of the partition wall 95 side and the transmission-mechanism-side cover case 96 side, each of the pair of second bearings B2 can be appropriately lubricated.

Incidentally, when the oil level of the first oil receiving portion 7 is tilted due to an attitude change, acceleration, or the like of the vehicle, there is a case in which the second rotor 2r and the oil stored in the first oil receiving portion 7 interfere with each other. Due to this interference, when the oil is agitated, various influences may occur, such as a reduction in efficiency of the second rotary electric machine 2 due to an occurrence of rotation resistance of the second rotor 2r, a reduction in an amount of heat exchange due to foaming of the oil, or a reduction in a discharge pressure or a flow rate of the oil pump due to an occurrence of air bubbles in the oil. The vehicle drive device 100 of the present embodiment is configured such that interference between oil and the second rotor 2r can be reduced when the oil level of the stored oil is tilted due to an attitude change, acceleration, or the like of the vehicle, and such that oil having cooled the second rotary electric machine 2 can be stored and the oil can be appropriately supplied to the lubrication target part (first bearing B1 or first input gear G10) different from the second rotary electric machine 2.

As described above, the vehicle drive device 100 of the present embodiment includes the input member (first input member 11) drivingly coupled to the internal combustion engine 3 and disposed on the first axis A1, the output member 5 drivingly coupled to the wheel W, the rotary electric machine (second rotary electric machine 2) disposed on the second axis A2 and including the rotor (second rotor 2r), the second axis A2 being an axis different from the first axis A1 and being parallel to the first axis A1, and the power transmission mechanism 20 that transmits power among the first input member 11, the output member 5, and the second rotary electric machine 2. In addition, the second axis A2 is arranged on the upward side V1 relative to the first axis A1. Further, the vehicle drive device 100 includes the oil receiving portion (first oil receiving portion 7) disposed on the downward side V2 of the second rotary electric machine 2 to receive the oil for cooling supplied to the second rotary electric machine 2 and falling from the second rotary electric machine 2, and the first oil supply passage 70 that supplies the oil accumulated in the first oil receiving portion 7 to at least one of the first bearing B1 supporting the first input member 11 or the input gear (first input gear G10) that rotates together with the first input member 11. Flow ports 79 communicating with the first oil supply passage 70 and a discharge port 4 that discharges the oil in the first oil receiving portion 7 are formed to face the first oil receiving portion 7. The oil accumulated in the first oil receiving portion 7 is supplied from the flow port 79 to at least one of the first bearing B1 or the first input gear G10 through the first oil supply passage 70. Excess oil (oil interfering with the second rotor 2r) is discharged from the discharge port 4 as described later. By allowing the vehicle drive device 100 of the present embodiment to include this discharge port 4, it is possible to reduce interference with the second rotor 2r when the oil level of the oil stored in the first oil receiving portion 7 is tilted due to an attitude change, acceleration, or the like of the vehicle.

Note that each of the flow port 79 and the discharge port 4 refers to a portion facing the first oil receiving portion 7, and the shape thereof may be a hole-shaped opening or a groove-shaped opening. In addition, each of the flow port 79 and the discharge port 4 may be an opening at an end portion of a wall surface of the case 9 or the like. Here, the phrase "face the first oil receiving portion 7" means to "face the side where the first oil receiving portion 7 is positioned". For example, in a state where no oil is accumulated in the first oil receiving portion 7, the flow port 79 is not soaked with the oil. In addition, the discharge port 4 is also brought into a state of being soaked with the oil only when the oil needs to be discharged. Therefore, the phrase "face the first oil receiving portion 7" does not necessarily mean facing "oil" in the first oil receiving portion 7 in a state where this oil is accumulated therein. Of course, the flow port 79 may face the "oil" in the first oil receiving portion 7 in a state where the oil is sufficiently accumulated therein, and the discharge port 4 faces the "oil" accumulated in the first oil receiving portion 7 when a region where the oil stored in the first oil receiving portion 7 is positioned is changed due to an attitude change or the like of the vehicle. Therefore, the phrase "face the first oil receiving portion 7" can include all of the concepts as described above.

Figure 5:
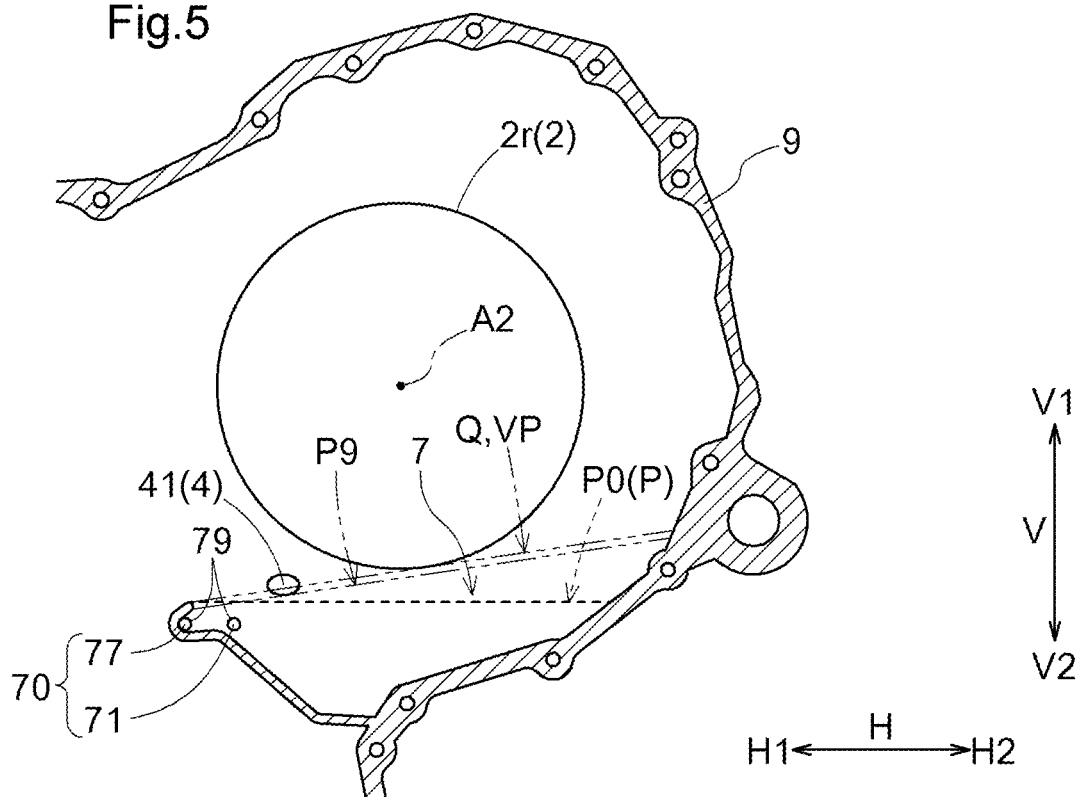
FIG. 5 is a view as viewed in the axial direction, schematically showing a relationship between an oil level (reference oil level) and each of a rotor, a discharge port, and flow ports when a vehicle is positioned on a horizontal plane.

Hereinafter, the disposition or arrangement of the flow ports 79 and the discharge port 4 will be described with reference also to FIGS. 5 to 10. As shown in FIG. 5, an oil level P formed in a state where the vehicle is stopped on a horizontal plane and the first oil receiving portion 7 is filled with oil is set as a reference oil level P0. In addition, the state in which the vehicle is positioned on the horizontal plane is the reference attitude. An oil level P formed in a state where the vehicle is stopped on the horizontal plane, the electric oil pump described above is operating, and the oil level of the first oil receiving portion 7 is stable (in other words, a state where the circulation state of the oil is a steady state) may be set as the reference oil level P0. The reference oil level P0 is set to be positioned on a lower side (downward side V2) relative to the second rotor 2r.

As shown in FIGS. 3 and 5, each of the flow ports 79 is provided such that at least a portion thereof, preferably the entirety thereof is positioned on a lower side relative to the reference oil level P0. In the present embodiment, each of the flow ports 79 is provided such that the entirety thereof is positioned on the lower side relative to the reference oil level P0. In the present embodiment, it can be said that the reference oil level P0 is set on a lower side relative to the second rotor 2r and on an upper side (upward side V1) relative to the flow ports 79, in the first oil receiving portion 7. Moreover, the discharge port 4 is provided on an upper side relative to this reference oil level P0.

Figure 6:
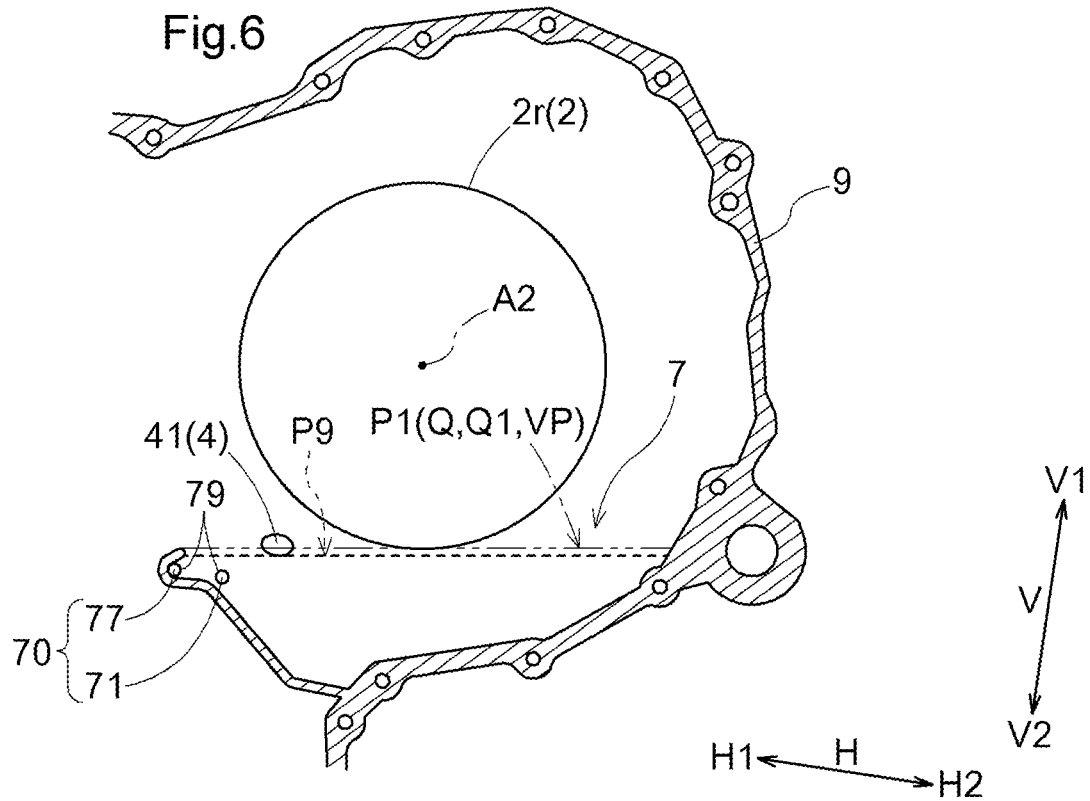
FIG. 6 is a view as viewed in the axial direction, schematically showing a relationship between an oil level and each of the rotor, the discharge port, and the flow ports when the vehicle is tilted to one side in a front-rear direction.

FIG. 6 schematically shows a relationship between an oil level (first oil level P1) and each of the second rotor 2r, the discharge port 4, and the flow ports 79 when the vehicle is tilted to one side in the front-rear direction (width direction H). In the present embodiment, the first widthwise side H1 corresponds to the front side of the vehicle, and the second widthwise side H2 corresponds to the rear side of the vehicle. The example shown in FIG. 6 assumes, for example, a case in which the vehicle climbs a slope (ascends a slope). In addition, when focus is made only on the oil level P, for example, an oil level P in a case where acceleration in the forward direction occurs in the vehicle at the time of acceleration of the vehicle (in a case where negative acceleration due to inertial force occurs in the oil) also exhibits a similar tilt. Note that the change in the attitude of the vehicle includes a change due to deflection of the wheel W (tire) or a change due to extension and contraction of a suspension.

Here, the first oil level P1 is an oil level P brought into a state where the oil contacts with the second rotor 2r by the oil level P being tilted due to an attitude change and acceleration or deceleration of the vehicle, and the first oil level P1 is a limitation-target oil level Q. As will be described later, the oil level P may be tilted also in a case where the vehicle is tilted in the left-right direction. Also in this case, a limitation-target oil level Q is similarly set. In a case where these limitation-target oil levels Q are distinguished, the limitation-target oil level Q set when the vehicle is tilted in the front-rear direction is referred to as a first target oil level Q1.

As shown in FIGS. 5 and 6, the discharge port 4 is provided to include a portion positioned on a lower side relative to the limitation-target oil level Q. Note that the "lower side" in this case refers to the downward side in the vertical direction regardless of the attitude of the vehicle, but, in the present embodiment, as shown in FIG. 5, even in a case where the limitation-target oil level Q is imaginarily set in the reference attitude, the discharge port 4 is provided on the upper side relative to the reference oil level P0 and is provided to include a portion positioned on the lower side relative to the limitation-target oil level Q. In other words, as shown in FIG. 3, the discharge port 4 includes at least a portion present on a lower side relative to an imaginary plane VP that passes through a tip end t7 at the upper position of the first oil receiving portion 7 and that is in contact with a lower end t2 of the second rotor 2r across the entire axial direction L of the second rotor 2r. That is, the discharge port 4 is provided at a position where the oil can be discharged from the first oil receiving portion 7 such that the second rotor 2r is not soaked with the oil, in a state where the oil is accumulated in the first oil receiving portion 7 while the oil does not overflow from the tip end t7 of the first oil receiving portion 7 when the vehicle is tilted only in the front-rear direction.

FIG. 7 schematically shows a relationship between an oil level (second oil level P2) and each of the second rotor 2r, the discharge port 4, and the flow ports 79 when the vehicle is tilted to the other side in the front-rear direction (width direction H). As described above, in the present embodiment, the first widthwise side H1 corresponds to the front side of the vehicle, and the second widthwise side H2 corresponds to the rear side of the vehicle. The example shown in FIG. 7 assumes, for example, a case in which the vehicle climbs down a slope (descends a slope). In addition, when focus is made only on the oil level P, for example, an oil level P in a case where negative acceleration in the forward direction occurs in the vehicle at the time of deceleration of the vehicle (in a case where positive acceleration due to inertial force occurs in the oil) also exhibits a similar tilt.

Here, the second oil level P2 is an oil level P brought into a state where the oil level P is tilted due to an attitude change and acceleration or deceleration of the vehicle. However, unlike the first oil level P1, the second oil level P2 is not brought into the state where the oil contacts with the second rotor 2r. Therefore, the second oil level P2 is not the limitation-target oil level Q. As shown in FIG. 7, in a state where the oil level P in the first oil receiving portion 7 becomes the second oil level P2, the oil overflows from the first oil receiving portion 7, and the amount of oil stored in the first oil receiving portion 7 is reduced. In the present embodiment, as shown in FIG. 7, even if the oil level P is tilted, each of the flow ports 79 is provided to be positioned on the lower side relative to the oil level P (second oil level P2). Therefore, even in this case, the oil can be appropriately supplied to the first bearing B1 and the first input gear G10 through the first oil supply passage 70.

That is, the flow ports 79 are preferably provided on a lower side relative to a predefined oil level P (a lower limit oil level, for example, the second oil level P2) set assuming a case where the amount of oil stored in the first oil receiving portion 7 is reduced by a tilt due to an attitude change and acceleration or deceleration of the vehicle. Note that this lower limit oil level is preferably set in accordance with an angle of a tilt in the front-rear direction allowable for the vehicle, negative acceleration, or the like.

In addition, in the present embodiment, as shown in FIG. 6, the flow ports 79 are provided to be positioned on a lower side relative to an oil level P (upper limit oil level P9) that is parallel to the limitation-target oil level Q and that passes through a lower end of the discharge port 4. When the oil stored in the first oil receiving portion 7 is discharged from the discharge port 4, the oil level P is reduced to the upper limit oil level P9. By causing the flow ports 79 to be positioned on the lower side relative to the upper limit oil level P9, the oil for lubrication can be sufficiently supplied from the flow ports 79 while interference between the stored oil in the first oil receiving portion 7 and the second rotor 2r can be reduced.

That is, according to the present embodiment, even when the oil level is tilted due to an attitude change and acceleration or deceleration of the vehicle and the oil is discharged from the discharge port 4, the flow port 79 for oil is positioned on the lower side relative to the oil level at that time, and thus the oil for lubrication can be appropriately supplied to at least one of the first bearing B1 or the input gear (first input gear G10) through the oil supply passage (first oil supply passage 70).

Note that in a case where the vehicle is in the reference attitude, when each of the flow ports 79 is provided to be positioned on the lower side relative to the reference oil level P0, the oil for lubrication can be supplied from each of the flow ports 79. As shown in FIG. 5, in the case of the reference attitude, a region on a lower side relative to the reference oil level P0 may include a region on an upper side relative to the upper limit oil level P9. Therefore, a mode in which the flow port 79 is provided on the lower side relative to the reference oil level PO and on the upper side relative to the upper limit oil level P9 is not precluded.

In the above description, the case in which the vehicle is tilted in the front-rear direction has been described. In addition, at the time of turning or the like, the vehicle may be tilted also in the left-right direction due to a road geometry or acceleration (also including deflection of the wheel W (tire) or extension and contraction of a suspension). Moreover, even when the vehicle is tilted in the left-right direction, there is a possibility that the oil stored in the first oil receiving portion 7 and the second rotor 2r interfere with each other. FIG. 8 schematically shows a relationship between the oil level P (reference oil level P0) and each of the second rotor 2r, the discharge ports 4, and the flow ports 79 when the vehicle is positioned on the horizontal plane (maintained in the reference attitude), as viewed in a direction orthogonal to the axial direction.

Note that in each of FIGS. 3 and 5 to 7 schematically showing a wall surface in the main body case 97 on the first chamber 91 side as viewed in the axial direction, only a first discharge port 41 provided on the second axial side L2 is exemplarily shown, and in the above description, the first discharge port 41 is described as the discharge port 4. In each of FIGS. 8 to 10 as viewed in the direction orthogonal to the axial direction, a mode is exemplarily shown in which a second discharge port 42 provided on the first axial side L1 with respect to the first discharge port 41 is also included, in addition to the first discharge port 41 exemplarily shown with reference to FIGS. 3 and 5 to 7. Note that FIGS. 8 to 10 are schematic views and the opening shapes of the discharge port 4 and the flow port 79 are similar to those in FIGS. 5 to 7 regardless of the angle at which the discharge port 4 and the flow port 79 are viewed, in order to facilitate understanding.

Figure 9:
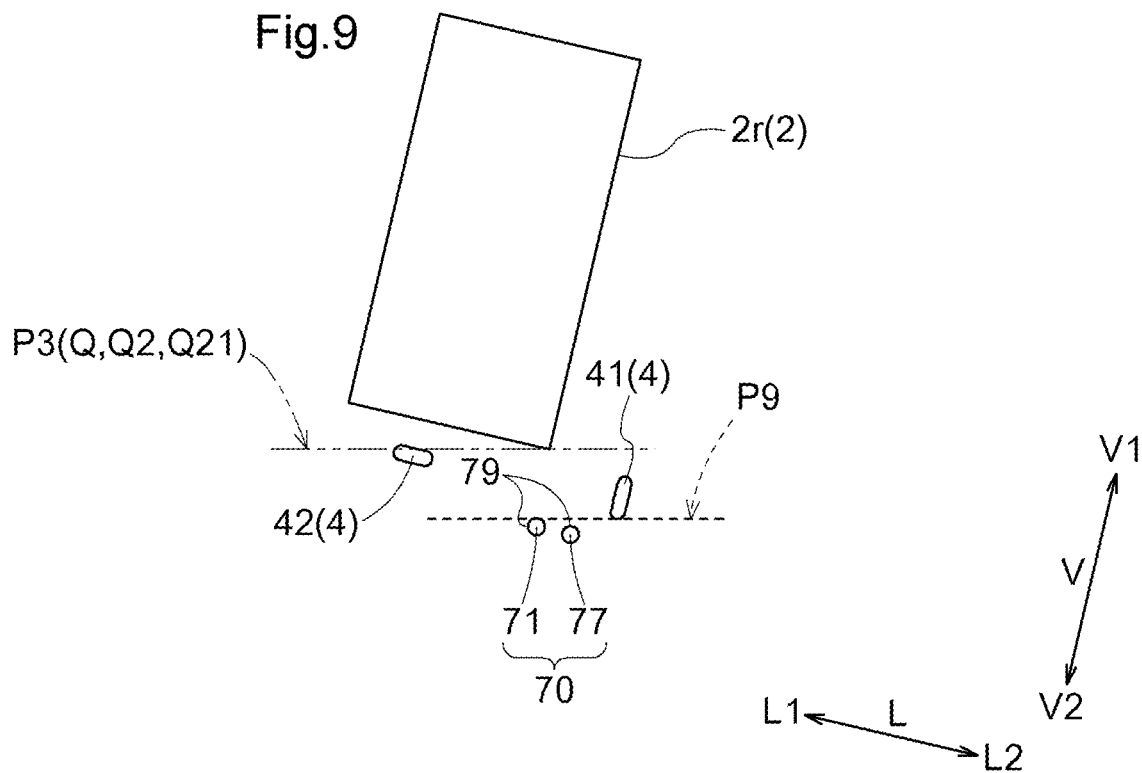
FIG. 9 is a view as viewed in the direction orthogonal to the axial direction, schematically showing a relationship between an oil level and each of the rotor, the discharge ports, and the flow ports when the vehicle is tilted to one side in a left-right direction.

FIG. 9 schematically shows a relationship between the oil level P and each of the second rotor 2r, the discharge ports 4, and the flow ports 79 when the vehicle is tilted to one side in the left-right direction (axial direction L). In the example shown in FIG. 9, for example, a case is assumed in which the vehicle is tilted in the left-right direction such that the second axial side L2 is lower and the first axial side L1 is upper. In addition, when focus is made only on the oil level P, for example, a similar tilt is exhibited when acceleration (centrifugal force) toward the first axial side L1 occurs in the vehicle at the time of turning of the vehicle and a force toward the second axial side L2 acts on the oil by inertial force to leave the oil. Although not shown, the tilt of the oil level P with respect to the second rotor 2r is similar to that in FIG. 9 even when acceleration (centrifugal force) toward the second axial side L2 continues acting on the vehicle at the time of turning of the vehicle and similarly, acceleration toward the second axial side L2 acts on the oil.

Figure 10:
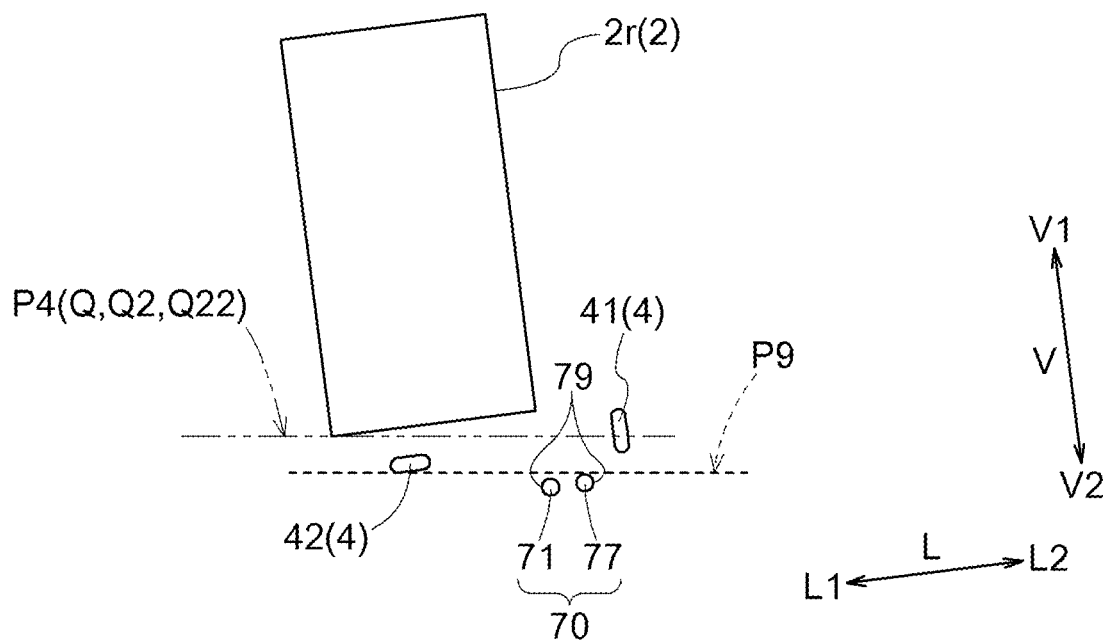
FIG. 10 is a view as viewed in the direction orthogonal to the axial direction, schematically showing a relationship between an oil level and each of the rotor, the discharge ports, and the flow ports when the vehicle is tilted to the other side in the left-right direction.

FIG. 10 schematically shows a relationship between the oil level P and each of the second rotor 2r, the discharge ports 4, and the flow ports 79 when the vehicle is tilted to the other side in the left-right direction (axial direction L). In the example shown in FIG. 10, for example, a case is assumed in which the vehicle is tilted in the left-right direction such that the first axial side L1 is lower and the second axial side L2 is upper. In addition, when focus is made only on the oil level P, for example, a similar tilt is exhibited when acceleration (centrifugal force) toward the second axial side L2 occurs in the vehicle at the time of turning of the vehicle and a force toward the first axial side L1 acts on the oil by inertial force to leave the oil. Although not shown, the tilt of the oil level P with respect to the second rotor 2r is similar to that in FIG. 10 even when acceleration (centrifugal force) toward the first axial side L1 continues acting on the vehicle at the time of turning of the vehicle and similarly, acceleration toward the first axial side L1 acts on the oil.

Both a third oil level P3 in FIG. 9 and a fourth oil level P4 in FIG. 10 are oil levels P brought into a state of contacting with the second rotor 2r by being tilted due to an attitude change and acceleration or deceleration of the vehicle, and the third oil level P3 and the fourth oil level P4 correspond to the limitation-target oil levels Q. Each of these limitation-target oil levels Q is referred to as a second target oil level Q2, in a case where each of these limitation-target oil levels Q is distinguished from the limitation-target oil level Q (first target oil level Q1) set when the state is brought into a state of contacting with the second rotor 2r by the vehicle being tilted in the front-rear direction. In addition, in a case where the third oil level P3 and the fourth oil level P4 as the second target oil levels Q2 are distinguished from each other, the third oil level P3 is referred to as a first second target oil level Q21, and the fourth oil level P4 is referred to as a second second target oil level Q22.

As shown in FIG. 8, each of the flow ports 79 is provided such that at least a portion thereof, preferably the entirety thereof is positioned on the lower side relative to the reference oil level P0, also as viewed in the direction orthogonal to the axial direction. In the present embodiment, each of the flow ports 79 is provided such that the entirety thereof is positioned on the lower side relative to the reference oil level P0. In the present embodiment, it can be said that the reference oil level P0 is set on the lower side relative to the second rotor 2r and on the upper side relative to the flow ports 79, in the first oil receiving portion 7. Moreover, the discharge port 4 is provided on the upper side relative to this reference oil level P0.

In addition, as shown in FIGS. 9 and 10, the discharge port 4 is provided to include a portion positioned on the lower side relative to the limitation-target oil level Q (second target oil level Q2). Further, in the present embodiment, a mode is exemplarily shown in which the first discharge port 41 disposed relatively on the second axial side L2 as viewed in the axial direction and the second discharge port 42 disposed relatively on the first axial side L1 as viewed in the axial direction are included as the discharge ports 4.

When the vehicle is tilted in the left-right direction such that the second axial side L2 is lowered, the discharge ports 4 are provided such that the entire first discharge port 41 provided on the second axial side L2 is positioned on the lower side relative to the second target oil level Q2, and such that at least a portion of the second discharge port 42 provided on the first axial side L1 is positioned on the lower side relative to the second target oil level Q2, as shown in FIG. 9. In addition, when the vehicle is tilted in the left-right direction such that the first axial side L1 is lowered, the discharge ports 4 are provided such that the entire second discharge port 42 provided on the first axial side L1 is positioned on the lower side relative to the second target oil level Q2, and such that at least a portion of the first discharge port 41 provided on the second axial side L2 is positioned on the lower side relative to the second target oil level Q2, as shown in FIG. 10. That is, by providing the first discharge port 41 and the second discharge port 42 on the opposite sides in the axial direction L with respect to the second rotor 2r, a configuration is made in which the oil is discharged from at least any of the discharge ports 4, and in which the second rotor 2r and the oil in the first oil receiving portion 7 hardly interfere with each other, even when the vehicle is tilted in any of directions in the left-right direction.

Further, as described above with reference to FIG. 6 and the like regarding the example in the case where the vehicle is tilted in the front-rear direction, even when the vehicle is tilted in the left-right direction, in the present embodiment, the flow ports 79 are provided to be positioned on the lower side relative to the oil level P (upper limit oil level P9), which is parallel to the limitation-target oil level Q and passes through the lower end of the discharge port 4. When the oil stored in the first oil receiving portion 7 is discharged from the discharge port 4, the oil level P is reduced to the upper limit oil level P9. By causing the flow ports 79 to be positioned on the lower side relative to the upper limit oil level P9, the oil for lubrication can be sufficiently supplied from the flow ports 79 while interference between the stored oil and the second rotor 2r can be reduced.

In addition, as described above, in the present embodiment, the limitation-target oil level Q includes the first target oil level Q1 that is the oil level P brought into a state of contacting with the second rotor 2r by the vehicle being tilted in the front-rear direction, and the second target oil level Q2 that is the oil level P brought into a state of contacting with the second rotor 2r by the vehicle being tilted in the left-right direction. Moreover, the discharge port 4 is provided to include a portion positioned on a lower side relative to both the first target oil level Q1 and the second target oil level Q2.

With such a configuration, the oil is discharged from the discharge port 4, both in a case where the oil level P is tilted in the front-rear direction of the vehicle and in a case where the oil level P is tilted in the left-right direction of the vehicle, due to an attitude change and acceleration or deceleration of the vehicle. Thus, the oil level P of the oil receiving portion (first oil receiving portion 7) is easily maintained on the lower side relative to the lower end of the rotor (second rotor 2r). Each of the flow ports 79 for oil is positioned on the lower side relative to the first target oil level Q1 and the second target oil level Q2, which are the oil levels P in these respective cases. Therefore, the oil for lubrication can be appropriately supplied to at least one of the first bearing B1 or the input gear (first input gear G10) through the oil supply passage (first oil supply passage 70). In addition, a structure provided with the discharge port 4 and the flow port 79 is easily simplified regardless of the directions in which the oil level P is tilted.

Further, in the present embodiment, the discharge port 4 includes the first discharge port 41 and the second discharge port 42. Moreover, as shown in FIGS. 5 and 6, the first discharge port 41 is provided to include a portion positioned on the lower side relative to the first target oil level Q1. In addition, the second discharge port 42 is provided to include a portion positioned on the lower side relative to the second target oil level Q2 (both the first second target oil level Q21 and the second second target oil level Q22).

With such a configuration, the oil is discharged from the first discharge port 41 or the second discharge port 42, both in a case where the oil level P is tilted in the front-rear direction of the vehicle and in a case where the oil level P is tilted in the left-right direction of the vehicle, due to an attitude change and acceleration or deceleration of the vehicle. Thus, the oil level P of the oil receiving portion (first oil receiving portion 7) is easily maintained on the lower side relative to the lower end of the rotor (second rotor 2r). Each of the flow ports 79 for oil is positioned on the lower side relative to the first target oil level Q1 and the second target oil level Q2, which are the oil levels P in these respective cases. Therefore, the oil for lubrication can be appropriately supplied to at least one of the first bearing B1 or the input gear (first input gear G10) through the oil supply passage (first oil supply passage 70). In addition, by disposing the first discharge port 41 and the second discharge port 42 to correspond to the directions in which the oil level is tilted, the discharge port 4 can be easily provided at an appropriate position, and complication of the structure provided with the discharge port 4 and the flow port 79 can be reduced.

Note that for the discharge port 4, a discharge port 4 corresponding only to the tilt in the front-rear direction and a discharge port 4 corresponding only to the tilt in the left-right direction may be provided separately, or a single discharge port 4 may correspond to both the tilt in the front-rear direction and the tilt in the left-right direction. In addition, in a case where the discharge ports 4 are provided at a plurality of locations, the discharge ports 4 may include both a discharge port 4 corresponding to only a tilt toward any one side of the tilt in the front-rear direction and the tilt in the left-right direction, and a discharge port 4 corresponding to both. Of course, in a case where the discharge ports 4 are provided at a plurality of locations, all the discharge ports 4 may be the discharge ports 4 each corresponding to both the tilt in the front-rear direction and the tilt in the left-right direction.

In addition, in a case where the first discharge port 41 acts exclusively on the discharge of oil occurring when the vehicle is tilted in the front-rear direction, and the second discharge port 42 acts exclusively on the discharge of oil occurring when the vehicle is tilted in the left-right direction, the first discharge port 41 and the second discharge port 42 may be provided as follows. For example, the first discharge port 41 may be provided to include a portion positioned on the lower side relative to the first target oil level Q1 while the first discharge port 41 may be provided to be positioned on the upper side relative to the second target oil level Q2. In addition, the second discharge port 42 may be provided to include a portion positioned on the lower side relative to the second target oil level Q2 while the second discharge port 42 may be provided to be positioned on the upper side relative to the first target oil level Q1.

Further, in the present embodiment, the mode has been exemplarily shown in which a configuration is made such that interference between the second rotor 2r and the oil in the first oil receiving portion 7 can be reduced in both of the case where the vehicle is tilted in the front-rear direction and the case where the vehicle is tilted in the left-right direction. However, in view of the frequency of occurrences of the case where the vehicle is tilted in the front-rear direction and the case where the vehicle is tilted in the left-right direction, the influences in the cases of the occurrences having happened, and the like, a configuration may be made such that the interference between the second rotor 2r and the oil in the first oil receiving portion 7 can be reduced in only one of the case where the vehicle is tilted in the front-rear direction and the case where the vehicle is tilted in the left-right direction.

As described above, the vehicle drive device 100 of the present embodiment includes the first rotary electric machine 1 and the second rotary electric machine 2. Moreover, the power transmission mechanism 20 can implement two operation modes of the series mode and the parallel mode by changing the power transmission state among the first input member 11, the output members 5, the first rotary electric machine 1, and the second rotary electric machine 2. Here, the series mode is a mode where a state is obtained in which drive power is transmitted between the first input member 11 and the first rotary electric machine 1 and drive power is transmitted between the second rotary electric machine 2 and the output members 5, and the parallel mode is a mode where a state is obtained in which drive power is transmitted among the input member (first input member), the second rotary electric machine 2, and the output members 5.

In the series mode, electric power is generated by the first rotary electric machine 1 using the drive power of the internal combustion engine 3, and the wheels W are driven by the second rotary electric machine 2. For example, when the vehicle is stopped in the series mode, there is a case in which the input member (first input member 11) supported by the first bearings B1 is rotated by the drive power of the internal combustion engine 3 while the output members 5 are in a state of being not rotated. According to the present embodiment, even in a case where oil supply with scooping cannot be performed in a state where the output members 5 do not rotate as described above, the oil can be supplied to at least one of the first bearing B1 or the input gear (first input gear G10). That is, even when the vehicle is stopped in the series mode, it is possible to appropriately lubricate at least one of the first bearing B1 supporting the input member (first input member 11) that rotates for electric power generation, or the input gear (first input gear G10) that rotates together with the input member (first input member 11).

Other Embodiments

Other embodiments will be described below. Note that the configurations of the embodiments described below are not limited to those applied separately, and can be applied in combination with the configurations of other embodiments as long as no contradiction arises.

Figure 11:
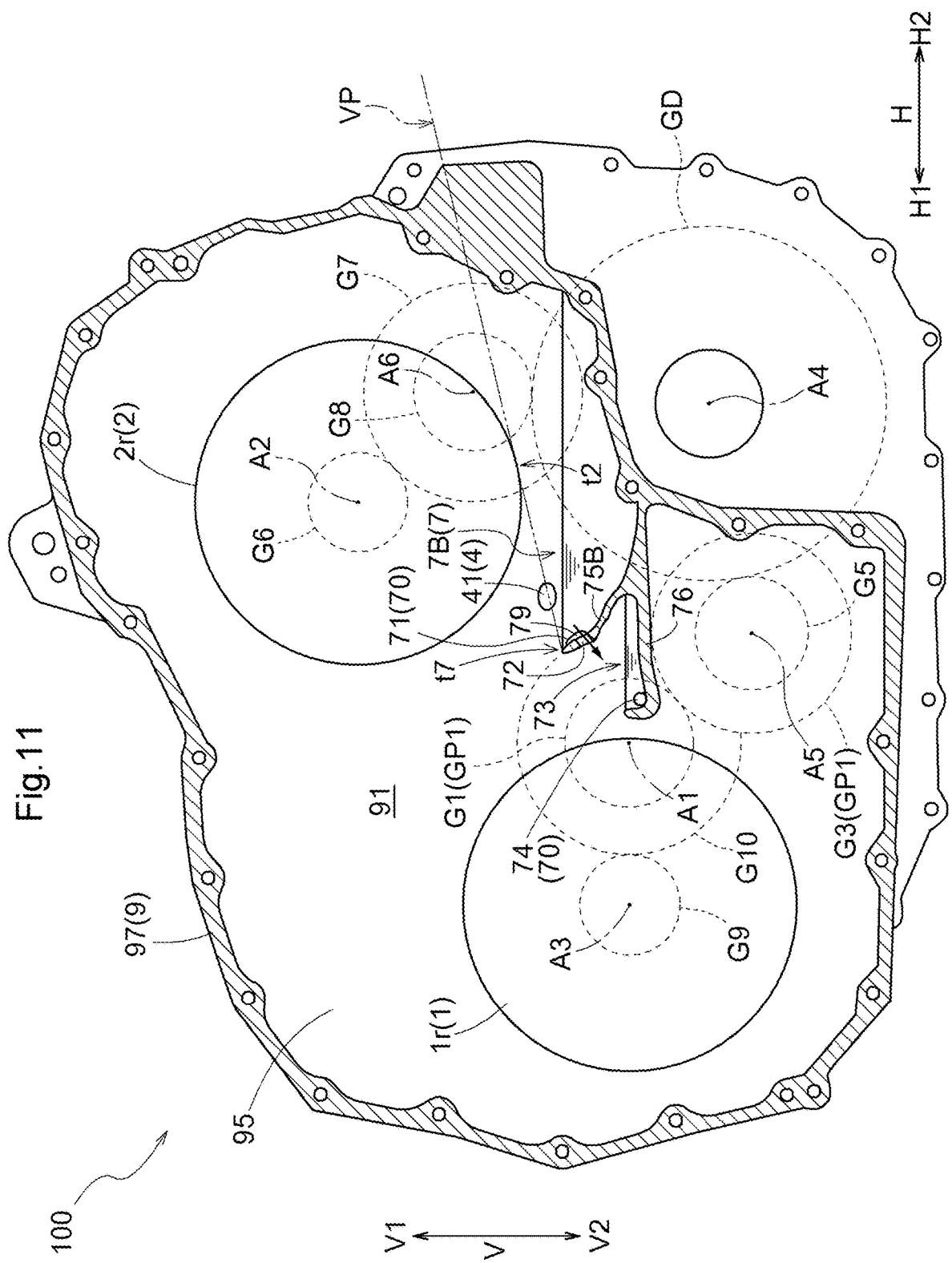
FIG. 11 is a schematic cross-sectional view, showing another configuration example of an oil receiving portion, in which the first chamber is viewed from a side facing the partition wall, in the axial direction.

(1) FIG. 11 shows another configuration example of the oil receiving portion. Hereinafter, common parts will be described using the same reference signs as those in the mode described above with reference to FIGS. 1 to 4. As shown in FIG. 11, in the first chamber 91, a third oil receiving portion 73 may be provided in addition to the first oil receiving portion 7 (second first oil receiving portion 7B). For example, in a rib (second first main-body-side rib 75B) forming the first oil receiving portion 7, a branched oil passage 72 is formed at the same position as the position of the first first oil passage 71 in the upward-downward direction V such that the branched oil passage 72 is adjacent to the first first oil passage 71. Since the first first oil passage 71 and the branched oil passage 72 are formed at the same position in the upward-downward direction V, oil accumulated in the first oil receiving portion 7 flows through both the oil passages at substantially the same rate. Note that the branched oil passage 72 may be formed in the first cover-side rib abutting on the first main-body-side rib 75, or may be formed in both the first main-body-side rib 75 and the first cover-side rib. The third oil receiving portion 73 is formed on the downward side V2 of the first oil receiving portion 7 to receive the oil from the branched oil passage 72.

Note that similarly to the first oil receiving portion 7, the third oil receiving portion 73 is also formed by abutment between a rib (third main-body-side rib 76) formed in the main body case 97 and a rib (third cover-side rib, not shown) formed in the rotary-electric-machine-side cover case. For the third oil receiving portion 73, a third oil passage 74 is provided, which penetrates through the partition wall 95 to allow communication between the first chamber 91 and the second chamber 92. The oil having passed through the third oil passage 74 lubricates the first bearing B1 for the first input member 11. Since the oil stored in the third oil receiving portion 73 is supplied from the first oil receiving portion 7, the third oil passage 74 supplies the oil accumulated in the first oil receiving portion 7 to the first bearing B1 supporting the input member. That is, the third oil passage 74 forms the first oil supply passage 70 together with the first first oil passage 71. In addition, the oil having passed through the third oil passage 74 lubricates the first bearing B1 on the left side in the drawing, and then is supplied to the shaft internal space 11e of the first input member 11, as described above with reference to FIG. 2. This oil performs shaft internal lubrication, and is also used for lubrication of other portions through the oil passage provided radially from the shaft internal space 11e.

(2) The mode of the vehicle drive device 100 is not limited to a mode (so-called two-motor series-parallel hybrid) in which two rotary electric machines (first rotary electric machine 1 and second rotary electric machine 2) including the second rotary electric machine 2 are included, and in which, in a power transmission path from an internal combustion engine 3 to wheels W, the internal combustion engine 3, the one rotary electric machine (first rotary electric machine 1), the other rotary electric machine (second rotary electric machine 2), and the wheels W are arranged in the described order, like the mode as described above. Another configuration may be adopted as long as a mode is made in which an axis (first axis A1) on which the internal combustion engine 3 is disposed is positioned on the lower side in the upward-downward direction V relative to an axis (second axis A2) on which a rotor (second rotor 2r) whose interference with an oil receiving portion (first oil receiving portion 7) is to be reduced is disposed.

For example, the vehicle drive device 100 may be in a mode of a so-called one-motor parallel hybrid in which, in a power transmission path from an internal combustion engine to wheels, the internal combustion engine, one rotary electric machine, and the wheels are arranged in the described order. In addition, in a case where the vehicle drive device 100 adopts the one-motor parallel hybrid, a mode may be adopted in which a rotary electric machine is arranged in parallel to a power transmission path in which an internal combustion engine and wheels are arranged in the described order, and in which the rotary electric machine can transmit torque to the power transmission path. Further, the vehicle drive device 100 may adopt a two-motor split hybrid including a power split mechanism.

(3) In the above description, the mode has been exemplarily described in which the second axis A2 is arranged on the upward side relative to the first axis A1, and in which the first oil supply passage 70 supplies the oil accumulated in the first oil receiving portion 7 from the flow port 79 to at least one of the first bearing B1 supporting the first input member 11 or the first input gear G10 that rotates together with the first input member 11. However, the arrangement between the first axis A1 and the second axis A2 is not limited to this configuration, and the destination to which oil is supplied through the first oil supply passage 70 also need not include the first bearing B1 and the first input gear G10. The first oil supply passage 70 can adopt a mode in which the first oil supply passage 70 supplies oil to any lubrication target part. That is, the first oil supply passage 70 is simply required to supply oil accumulated in the first oil receiving portion 7 to a lubrication target part from the flow port 79, which is formed to face the first oil receiving portion 7.

Overview of Present Embodiment

The vehicle drive device (100) described above will be briefly summarized below.

As one aspect, a vehicle drive device (100) is a vehicle drive device (100) including: an input member (11) drivingly coupled to an internal combustion engine (3) and disposed on a first axis (A1); an output member (5) drivingly coupled to a wheel (W); a rotary electric machine (2) disposed on a second axis (A2) and including a rotor (2r), the second axis (A2) being an axis different from the first axis (A1) and being parallel to the first axis (A1); and a power transmission mechanism (20) configured to transmit power among the input member (11), the output member (5), and the rotary electric machine (2), the vehicle drive device (100) further including: an oil receiving portion (7) disposed on a downward side of the rotary electric machine (2) to receive oil for cooling supplied to the rotary electric machine (2) and falling from the rotary electric machine (2); an oil supply passage (70) configured to supply oil accumulated in the oil receiving portion (7), from a flow port (79) to a lubrication target part, the flow port (79) being formed to face the oil receiving portion (7); and a discharge port (4) formed to face the oil receiving portion (7), the discharge port (4) being configured to discharge oil in the oil receiving portion (7), in which the discharge port (4) is provided on an upper side relative to a reference oil level (P0) and is provided to include a portion positioned on a lower side relative to a limitation-target oil level (Q), the reference oil level (P0) being set on a lower side relative to the rotor (2r) and on an upper side relative to the flow port (79), in the oil receiving portion (7), the limitation-target oil level (Q) being an oil level brought into a state of contacting with the rotor (2r) by being tilted due to an attitude change and acceleration or deceleration of a vehicle.

According to this configuration, the lubrication target part can be lubricated by using the oil having been supplied for cooling the rotary electric machine (2). Therefore, for lubricating the lubrication target part, it is not necessary to provide another oil supply source such as an oil pump. According to the present configuration, for example, even when the oil level (P) of the oil receiving portion (7) is tilted due to an attitude change or acceleration or deceleration of the vehicle accompanying the vehicle ascending or descending a slope, or turning, or the like, the oil level (P) is easily maintained on the lower side relative to the lower end (t2) of the rotor. Therefore, it is easy to avoid an increase in rotation resistance of the rotor (2r) and a reduction in an amount of heat exchange due to foaming of the oil, caused when the oil in the oil receiving portion (7) is agitated by the rotor (2r). As described above, according to the present configuration, the vehicle drive device (100) can be implemented in which interference with the rotor (2r) can be reduced when the oil level (P) of stored oil is tilted due to an attitude change, acceleration, or the like of the vehicle, and in which oil having cooled the rotary electric machine (2) can be stored and the oil can be appropriately supplied to the lubrication target part different from the rotary electric machine (2).

Here, the flow port (79) is preferably provided to be positioned on a lower side relative to an oil level (P9) that is parallel to the limitation-target oil level (Q) and that passes through a lower end of the discharge port (4).

When the oil stored in the oil receiving portion (7) is discharged from the discharge port (4), the oil level (P) is reduced to the oil level (P9) that is parallel to the limitation-target oil level (Q) and that passes through the lower end of the discharge port (4). By causing the flow port (79) to be positioned on the lower side relative to the oil level (P9), the oil for lubrication can be sufficiently supplied from the flow port (79) while interference between the stored oil and the rotor (2r) can be reduced.

Further, preferably, the limitation-target oil level (Q) includes a first target oil level (Q1) that is an oil level (P) brought into the state of contacting with the rotor (2r) by the vehicle being tilted in a front-rear direction, and a second target oil level (Q2) that is an oil level brought into the state of contacting with the rotor (2r) by the vehicle being tilted in a left-right direction, and the discharge port (4) is provided to include a portion positioned on a lower side relative to both the first target oil level (Q1) and the second target oil level (Q2).

With such a configuration, the oil is discharged from the discharge port (4) both in a case where the oil level (P) is tilted in the front-rear direction of the vehicle and in a case where the oil level (P) is tilted in the left-right direction of the vehicle due to an attitude change and acceleration or deceleration of the vehicle. Thus, the oil level (P) of the oil receiving portion (7) is easily maintained on the lower side relative to the lower end (2t) of the rotor (2r). The flow port (79) for oil is positioned on the lower side relative to the first target oil level (Q1) and the second target oil level (Q2), and thus the oil for lubrication can be appropriately supplied to the lubrication target part through the oil supply passage (70). In addition, a structure provided with the discharge port (4) and the flow port (79) is easily simplified regardless of the directions in which the oil level (P) is tilted.

Further, preferably, the limitation-target oil level (Q) includes a first target oil level (Q1) that is an oil level (P) brought into the state of contacting with the rotor (2r) by the vehicle being tilted in a front-rear direction, and a second target oil level (Q2) that is an oil level brought into the state of contacting with the rotor (2r) by the vehicle being tilted in a left-right direction, the discharge port (4) includes a first discharge port (41) and a second discharge port (42), the first discharge port (41) is provided to include a portion positioned on a lower side relative to the first target oil level (Q1), and the second discharge port (42) is provided to include a portion positioned on a lower side relative to the second target oil level (Q2 (Q21, Q22)).

With such a configuration, the oil is discharged from the first discharge port (41) or the second discharge port (42) both in a case where the oil level (P) is tilted in the front-rear direction of the vehicle and in a case where the oil level (P) is tilted in the left-right direction of the vehicle due to an attitude change and acceleration or deceleration of the vehicle. Thus, the oil level (P) of the oil receiving portion (7) is easily maintained on the lower side relative to the lower end of the rotor (2r). The flow port (79) for oil is positioned on the lower side relative to the first target oil level (Q1) and the second target oil level (Q2 (Q21, Q22)), and thus the oil for lubrication can be appropriately supplied to the lubrication target part through the oil supply passage (70). In addition, by disposing the first discharge port (41) and the second discharge port (42) to correspond to the directions in which the oil level (P) is tilted, the discharge port (4) can be easily provided at an appropriate position, and complication of the structure provided with the discharge port (4) and the flow port (79) can be reduced.

Further, in the vehicle drive device (100), preferably, the second axis (A2) is arranged on an upward side relative to the first axis (A1), and the oil supply passage (70) is configured to supply oil accumulated in the oil receiving portion (7), from the flow port (79) to at least one of a first bearing (B1) supporting the input member (11) or an input gear (G10) configured to rotate together with the input member (11).

In a case where the vehicle drive device (100) includes a rotary electric machine different from the rotary electric machine (2) or in other cases, for example, the internal combustion engine (3) can be driven while the wheel (W) is stopped, and the rotary electric machine different from the rotary electric machine (2) can be operated for regeneration to generate electric power. At this time, there is a case in which many of the rotary members of the power transmission mechanism (20) that transmits power between the output member (5) and the rotary electric machine (2) do not rotate, and in which an amount of oil that can be supplied by scooping or the like is reduced. On the other hand, the input member (11) drivingly coupled to the internal combustion engine (3) rotates together with the internal combustion engine (3), and the first bearing (B1) supporting the input member (11) and the input member (11) rotate relative to each other. According to the present configuration, the oil accumulated in the oil receiving portion (7) can be appropriately supplied, through the oil supply passage (70), to the input gear (G10) configured to rotate together with the input member (11) and the first bearing (B1) rotatably supporting the input member (11).

Further, preferably, the vehicle drive device (100) includes a case (9) including a first chamber (91) housing the rotary electric machine (2), a second chamber (92) housing the power transmission mechanism (20), and a partition wall (95) separating the first chamber (91) and the second chamber (92), in which the oil supply passage (70) penetrates through the partition wall (95) to allow communication between the first chamber (91) and the second chamber (92), and is configured to supply oil from the oil receiving portion (7) disposed in the first chamber (91) to the second chamber (92).

In a case where the rotary electric machine (2) and the power transmission mechanism (20) are respectively housed in the first chamber (91) and the second chamber (92), which are separated, the oil receiving portion (7) that receives the oil supplied to the rotary electric machine (2) and falling from the rotary electric machine (2) is preferably disposed in the first chamber (71) in which the rotary electric machine (2) is housed. The power transmission mechanism (20) disposed in the second chamber (92) often includes many rotary members and members supporting the rotary members (for example, bearings). Thus, there is an increased possibility that many lubrication target parts are disposed in the second chamber (92). According to the present configuration, the oil supply passage (70) is formed to penetrate through the partition wall (95) separating the first chamber (91) and the second chamber (92) to allow communication between the first chamber (91) and the second chamber (92). Therefore, even if the lubrication target part is disposed in the second chamber (92), the oil accumulated in the oil receiving portion (7) can be appropriately supplied to the lubrication target part.

REFERENCE SIGNS LIST

1: First rotary electric machine, 2: Second rotary electric machine (rotary electric machine), 2r: Second rotor (rotor), 3: Internal combustion engine, 4: Discharge port, 5: Output member, 7: First oil receiving portion (oil receiving portion), 7B: Second first oil receiving portion (oil receiving portion), 9: Case, 11: First input member (input member disposed on first axis), 20: Power transmission mechanism, 41: First discharge port, 42: Second discharge port, 70: First oil supply passage (oil supply passage), 71: First first oil passage (oil supply passage), 77: Second first oil passage (oil supply passage), 79: Flow port, 91: First chamber, 92: Second chamber, 95: Partition wall, 100: Vehicle drive device, A1: First axis, A2: Second axis, B1: First bearing, G10: First input gear (input gear configured to rotate together with input member), P: Oil level, P0: Reference oil level, Q: Limitation-target oil level, Q1: First target oil level, Q2: Second target oil level, Q21: First second target oil level (second target oil level), Q22: Second second target oil level (second target oil level), and W: Wheel

The invention claimed is:

1. A vehicle drive device comprising:
   an input member drivingly coupled to an internal combustion engine and disposed on a first axis;
   an output member drivingly coupled to a wheel;
   a rotary electric machine disposed on a second axis and including a rotor, the second axis being an axis different from the first axis and being parallel to the first axis; and
   a power transmission mechanism configured to transmit power among the input member, the output member, and the rotary electric machine,
   the vehicle drive device further comprising:
   an oil receiving portion disposed below the rotary electric machine to receive oil for cooling supplied to the rotary electric machine and falling from the rotary electric machine;
   an oil supply passage configured to supply oil accumulated in the oil receiving portion, from a flow port to a lubrication target part, the flow port being formed to face the oil receiving portion; and
   a discharge port formed to face the oil receiving portion, the discharge port being configured to discharge oil in the oil receiving portion,
   wherein
   the discharge port is provided above a reference oil level and is provided to include a portion positioned below a limitation-target oil level, the reference oil level being set below the rotor and above the flow port, in the oil receiving portion, the limitation-target oil level being an oil level brought into a state of contacting with the rotor by being tilted due to an attitude change and acceleration or deceleration of a vehicle.

2. The vehicle drive device according to claim 1, wherein the flow port is provided to be positioned below an oil level that is parallel to the limitation-target oil level and that passes through a lower end of the discharge port.

3. The vehicle drive device according to claim 1, wherein the limitation-target oil level includes a first target oil level that is an oil level brought into the state of contacting with the rotor by the vehicle being tilted in a front-rear direction, and a second target oil level that is an oil level brought into the state of contacting with the rotor by the vehicle being tilted in a left-right direction, and
the discharge port is provided to include a portion positioned below both the first target oil level and the second target oil level.

4. The vehicle drive device according to claim 1, wherein
the limitation-target oil level includes a first target oil level that is an oil level brought into the state of contacting with the rotor by the vehicle being tilted in a front-rear direction, and a second target oil level that is an oil level brought into the state of contacting with the rotor by the vehicle being tilted in a left-right direction,
the discharge port includes a first discharge port and a second discharge port,
the first discharge port is provided to include a portion positioned below the first target oil level, and
the second discharge port is provided to include a portion positioned below the second target oil level.

5. The vehicle drive device according to claim 1, wherein
the second axis is arranged on an upward side relative to the first axis, and
the oil supply passage is configured to supply oil accumulated in the oil receiving portion, from the flow port to at least one of a first bearing supporting the input member or an input gear configured to rotate together with the input member.

6. The vehicle drive device according to claim 1, further comprising:
a case including a first chamber housing the rotary electric machine, a second chamber housing the power transmission mechanism, and a partition wall separating the first chamber and the second chamber,
wherein
the oil supply passage penetrates through the partition wall to allow communication between the first chamber and the second chamber, and is configured to supply oil from the oil receiving portion disposed in the first chamber to the second chamber.

7. The vehicle drive device according to claim 2, wherein
the limitation-target oil level includes a first target oil level that is an oil level brought into the state of contacting with the rotor by the vehicle being tilted in a front-rear direction, and a second target oil level that is an oil level brought into the state of contacting with the rotor by the vehicle being tilted in a left-right direction, and
the discharge port is provided to include a portion positioned below both the first target oil level and the second target oil level.

8. The vehicle drive device according to claim 2, wherein
the limitation-target oil level includes a first target oil level that is an oil level brought into the state of contacting with the rotor by the vehicle being tilted in a front-rear direction, and a second target oil level that is an oil level brought into the state of contacting with the rotor by the vehicle being tilted in a left-right direction,
the discharge port includes a first discharge port and a second discharge port,
the first discharge port is provided to include a portion positioned below the first target oil level, and
the second discharge port is provided to include a portion positioned below the second target oil level.

9. The vehicle drive device according to claim 2, wherein
the second axis is arranged on an upward side relative to the first axis, and
the oil supply passage is configured to supply oil accumulated in the oil receiving portion, from the flow port to at least one of a first bearing supporting the input member or an input gear configured to rotate together with the input member.

10. The vehicle drive device according to claim 2, further comprising:
a case including a first chamber housing the rotary electric machine, a second chamber housing the power transmission mechanism, and a partition wall separating the first chamber and the second chamber,
wherein
the oil supply passage penetrates through the partition wall to allow communication between the first chamber and the second chamber, and is configured to supply oil from the oil receiving portion disposed in the first chamber to the second chamber.

* * * * *